US012244195B2

(12) United States Patent
Hikima et al.

(10) Patent No.: US 12,244,195 B2
(45) Date of Patent: Mar. 4, 2025

(54) STATOR ASSEMBLY APPARATUS AND STATOR ASSEMBLY METHOD

(71) Applicant: HONDA MOTOR CO., LTD., Tokyo (JP)

(72) Inventors: Norihiko Hikima, Tokyo (JP); Yasuto Ohashi, Tokyo (JP); Takumi Miyamoto, Tokyo (JP); Shoma Okubo, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 247 days.

(21) Appl. No.: 18/171,309

(22) Filed: Feb. 17, 2023

(65) Prior Publication Data
US 2023/0327508 A1    Oct. 12, 2023

(30) Foreign Application Priority Data
Mar. 24, 2022 (JP) ................. 2022-048351

(51) Int. Cl.
*H02K 3/34* (2006.01)
*H02K 1/16* (2006.01)
*H02K 15/10* (2006.01)
*H02K 15/12* (2006.01)

(52) U.S. Cl.
CPC ............. *H02K 3/345* (2013.01); *H02K 1/165* (2013.01); *H02K 15/105* (2013.01); *H02K 15/12* (2013.01)

(58) Field of Classification Search
CPC ...... H02K 1/165; H02K 3/345; H02K 15/105; H02K 15/12
USPC ........................................................ 310/215
See application file for complete search history.

(56) References Cited

U.S. PATENT DOCUMENTS

| 2019/0190359 | A1* | 6/2019 | Miyawaki | ................ H02K 3/04 |
| 2020/0220438 | A1 | 7/2020 | Ide et al. | |
| 2023/0163667 | A1* | 5/2023 | Ohashi | ................ H02K 15/066 29/734 |
| 2023/0170773 | A1* | 6/2023 | Hikima | ................ H02K 15/085 29/732 |
| 2023/0327508 | A1* | 10/2023 | Hikima | ................ H02K 15/105 310/215 |
| 2024/0275219 | A1* | 8/2024 | Yoshida | ................ H02K 15/022 |

FOREIGN PATENT DOCUMENTS

JP          6733823 B2      8/2020

* cited by examiner

*Primary Examiner* — Rashad H Johnson
(74) *Attorney, Agent, or Firm* — CKC & Partners Co. LLC

(57) ABSTRACT

Provided is a stator assembly apparatus configured to assemble a stator, the apparatus including: a plurality of guide members that are provided in a manner enabling insertion into and withdrawal from inside the electrically-insulating members in a central axial direction of the stator core, and are arranged in a radial direction of the slots in a state of having been inserted inside the electrically-insulating members; a presser configured to press the coil radially outward with respect to the stator core; and a controller configured to control movement of the plurality of guide members. Each time the coil moved by the presser come into contact with or approaches the guide member positioned most radially inside from among the plurality of guide members inside the electrically-insulating members, the controller causes the guide member positioned most radially inside to move so as to sequentially withdraw from within the electrically-insulating members.

10 Claims, 22 Drawing Sheets

STATOR ASSEMBLY APPARATUS AND STATOR ASSEMBLY METHOD

This application is based on and claims the benefit of priority from Japanese Patent Application No. 2022-048351, filed on 24 Mar. 2022, the content of which is incorporated herein by reference.

BACKGROUND OF THE INVENTION

Field of the Invention

The present invention pertains to a stator assembly apparatus and a stator assembly method.

Related Art

In the past, a technique described in Japanese Patent No. 6733823 is known as a technique for, within a stator core, inserting a coil into slots in a stator core into which electrically-insulating members have been mounted while preventing the electrically-insulating members from getting caught.

The technique described in Japanese Patent No. 6733823 causes an electrically-insulating member to open by inserting, from outside in the central axial direction of the stator core, two guide jigs, which are disposed slightly apart along the radial direction of the stator core, into a slot in the stator core to which the electrically-insulating member has been mounted, before coil insertion. While the coil is in contact with one guide jig in this state, the coil is moved radially inside the slot together with this guide jig to thereby be inserted inside the electrically-insulating member. Subsequently, after the two guide jigs are in contact with each other, the two guide jigs are withdrawn from within the slot.
Patent Document 1: Japanese Patent No. 6733823

SUMMARY OF THE INVENTION

In the technique described in Japanese Patent No. 6733823, after the two guide jigs are withdrawn from within the slot, there is a need for the coil to further move, within the slot, a distance corresponding to the width in the radial direction of the two guide jigs. At this time, because there is nothing to support the electrically-insulating member at a leading side in the coil insertion direction, the coil comes into contact with the electrically-insulating member when the coil moves. When the coil comes into contact with the electrically-insulating member, there is a risk the electrically-insulating member will be caught between the coil and the slot, and the electrically-insulating member will warp or buckle in conjunction with coil movement.

An objective of the present invention is to provide a stator assembly apparatus and a stator assembly method that, when inserting a coil into a slot from inside a stator core, enables insertion without catching an electrically-insulating member mounted to the slot.

(1) A stator assembly apparatus according to the present invention is a stator assembly apparatus (for example, a stator assembly apparatus 1 described below) configured to assemble a stator (for example, a stator 200 described below) by, from inside a stator core (for example, a stator core 2 described below), inserting a coil (for example, a belt-shaped coil 100 described below) into slots (for example, slots 22 described below) in the stator core, electrically-insulating members (for example, electrically-insulating papers 24 described below) being mounted to the slots, and includes: a plurality of guide members that are provided to respectively correspond to the slots, are provided in a manner enabling insertion into and withdrawal from inside the electrically-insulating members in a central axial direction of the stator core, and are arranged in a radial direction of the slots in a state of having been inserted inside the electrically-insulating members; a presser (for example, a coil pressing section 51 described below) configured to cause the coil to move inside the electrically-insulating members by pressing the coil radially outward with respect to the stator core and; and a controller (for example, a controller 10 described below) configured to control movement of the plurality of guide members (for example, a first guide member 61, second guide member 62, third guide member 63, and fourth guide member 64 described below) in the central axial direction of the stator core, in which, each time the coil moved by the presser comes into contact with or approaches a guide member positioned most radially inside from among the plurality of guide members inside the electrically-insulating members, the controller causes the guide member positioned most radially inside to move so as to sequentially withdraw from within the electrically-insulating members.

(2) In the stator assembly apparatus described in (1) above, the guide member most radially inside may be positioned at opening ends (for example, opening ends 24a described below) of the electrically-insulating member in a state of being inserted inside the electrically-insulating member, before the coil is inserted.

(3) In the stator assembly apparatus according to (1) or (2) above, each vertical width (for example, a vertical width W1 described below) of the plurality of guide members in a radial direction of the stator core may be the same width.

(4) In the stator assembly apparatus according to any of (1) through (3) above, each horizontal width (for example, a horizontal width W2 described below) of the plurality of guide members in a circumferential direction of the stator core may be greater than or equal to a width (for example, a width W0 described below) of the coil in the circumferential direction of the stator core.

(5) In the stator assembly apparatus according to any of (1) through (4) above, the plurality of guide members may be respectively disposed so as to face each other on both sides of the stator core in the central axial direction of the stator core and are disposed such that tip ends (for example, tip ends 61a, 62a, 63a, and 64a described below) of the plurality of guide members face each other inside the electrically-insulating members when inserted inside the electrically-insulating members from outside on both sides in the central axial direction of the stator core.

(6) A stator assembly method according to the present invention is a stator assembly method for assembling a stator (for example, the stator 200 described below) by, from inside a stator core (for example, the stator core 2 described below), inserting a coil (for example, the belt-shaped coil 100 described below) into slots (for example, the slots 22 described below) in the stator core, electrically-insulating members (for example, the electrically-insulating papers 24 described below) being mounted to the slots, the method including: an insertion step (for example, an insertion step described below) for inserting a plurality of guide members (for example, the first guide member 61, second guide member 62, third guide member 63, and fourth guide member 64 described below), arranged in a radial direction of the slots, inside the electrically-insulating members from outside in a central axial direction of the stator core, before inserting the coil into the slots; a movement step (for example, a first movement step, second movement step, third movement step, fourth movement step, and fifth movement step described below) for causing the coil to move radially outward with respect to the stator core until coming into contact or approaching, from among the plurality of guide members, a guide member positioned most radially inside; and a withdrawal step (for example, a first withdrawal step, second withdrawal step, third withdrawal step, and fourth withdrawal step described below) for, each time the coil moving radially outward with respect to the stator core come into contact with or approaches the guide member positioned most radially inside from among the plurality of guide members disposed inside the electrically-insulating members, sequentially withdrawing the guide member positioned most radially inside from within the electrically-insulating members.

(7) In the stator assembly method according to (6) above, the insertion step may include inserting the plurality of guide members such that the guide member most radially inside from among the plurality of guide members hangs at opening ends (for example, the opening ends 24a described below) of the electrically-insulating members.

(8) In the stator assembly method according to (6) or (7) above, each vertical width (for example, the vertical width W1 described below) of the plurality of guide members in a radial direction of the stator core may be the same width.

(9) In the stator assembly method according to any of (6) through (8) above, each horizontal width (for example, the horizontal width W2 described below) of the plurality of guide members in a circumferential direction of the stator core is greater than or equal to a width (for example, the width W0 described below) of the coil in the circumferential direction of the stator core.

(10) In the stator assembly method according to any of (6) through (9) above, it may be that the plurality of guide members are respectively disposed so as to face each other on both sides of the stator core in the central axial direction of the stator core, and the insertion step includes disposing the plurality of guide members such that the plurality of guide members are respectively inserted inside the electrically-insulating members from outside on both sides of the stator core in the central axial direction of the stator core and tip ends (for example, the tip ends 61a, 62a, 63a, and 64a described below) of the plurality of guide members face each other inside the electrically-insulating members.

By virtue of (1) above, when inserting the coil into slots from inside the stator core, the plurality of guide members can support the electrically-insulating members mounted into the slots such that the electrically-insulating members can open from inside. In addition, in a process in which the coil moves within a slot, the plurality of guide members sequentially withdraw in the central axial direction of the stator core without substantially moving in the radial direction within the slot, and thus it is possible to always keep the distance between the coil and a guide member to less than or equal to a set distance (the vertical width of a guide member in the radial direction of the stator core).

Accordingly, it is possible to insert the coil into the slots without catching or entangling the electrically-insulating members, and it is possible to improve buckling resistance for the electrically-insulating members. By changing, as appropriate, the vertical width of each guide member in the radial direction of the stator core or the number of guide members for a single slot, it is possible to easily handle changes for coil tension (rigidity) and insertion load. Moreover, because the direction of movement of the guide members is only in the central axial direction of the stator core, it is also possible to simplify movement mechanisms for the guide members.

By virtue of (2) above, a guide member is disposed between a pair of opening ends of an electrically-insulating member, whereby it is possible to hold the opening ends of the electrically-insulating member in an open state before insertion of the coil. As a result, contact between the coil, which moves toward the slot, and the electrically-insulating member is suppressed, and it is possible to smoothly introduce the coil inside the electrically-insulating member.

By virtue of (3) above, when causing the plurality of guide members to sequentially withdraw from within the slot in conjunction with movement of the coil, it is possible to keep the width of a gap in the radial direction within the slot to be less than or equal to a certain width. Accordingly, it is possible to establish both an effect of supporting the electrically-insulating members by the plurality of guide members such that the electrically-insulating members open, and an effect of improving insertability of the coil.

By virtue of (4) above, it is possible to more reliably prevent the coil, which moves into a slot, from catching the electrically-insulating member within the slot, in a state where the plurality of guide members have supported the electrically-insulating member such that the electrically-insulating member opens.

By virtue of (5) above, it is possible to reduce the travel distance for each of the plurality of guide members, and thus it is possible to shorten a travel time spent inserting and withdrawing the guide members.

By virtue of (6) above, when inserting the coil into a slot from inside the stator core, the plurality of guide members can support the electrically-insulating member mounted in the slot such that the electrically-insulating member can open. In addition, in a process in which the coil moves within a slot, the plurality of guide members sequentially withdraw in the central axial direction of the stator core without substantially moving in the radial direction within the slot, and thus it is possible to always keep the distance between the coil and a guide member to less than or equal to a set distance (the vertical width of a guide member in the radial direction of the stator core). Accordingly, it is possible to insert the coil into the slots without catching or entangling the electrically-insulating members, and it is possible to improve buckling resistance for the electrically-insulating members. By changing, as appropriate, the vertical width of each guide member in the radial direction of the stator core or the number of guide members for a single slot, it is possible to easily handle changes for coil tension (rigidity) and insertion load. Moreover, because the direction of movement of the guide members is only in the central axial direction of the stator core, it is also possible to simplify movement mechanisms for the guide members.

By virtue of (7) above, a guide member is disposed between a pair of opening ends of an electrically-insulating member, whereby it is possible to hold the opening ends of the electrically-insulating member in an open state before insertion of the coil. As a result, contact between the coil, which moves toward the slot, and the electrically-insulating member is suppressed, and it is possible to smoothly introduce the coil inside the electrically-insulating member.

By virtue of (8) above, when causing the plurality of guide members to sequentially withdraw from within the slot in conjunction with movement of the coil, it is possible to keep the width of a gap in the radial direction within the slot to be less than or equal to a certain width. Accordingly, it is possible to establish both an effect of supporting the electrically-insulating members by the plurality of guide members such that the electrically-insulating members open, and an effect of improving insertability of the coil.

By virtue of (9) above, it is possible to more reliably prevent the coil, which moves into a slot, from catching the electrically-insulating member within the slot, in a state where the plurality of guide members have supported the electrically-insulating member such that the electrically-insulating member opens.

By virtue of (10) above, it is possible to reduce the travel distance for each of the plurality of guide members, and thus it is possible to shorten a travel time spent inserting and withdrawing the guide members.

DETAILED DESCRIPTION OF THE INVENTION

Figure 1:
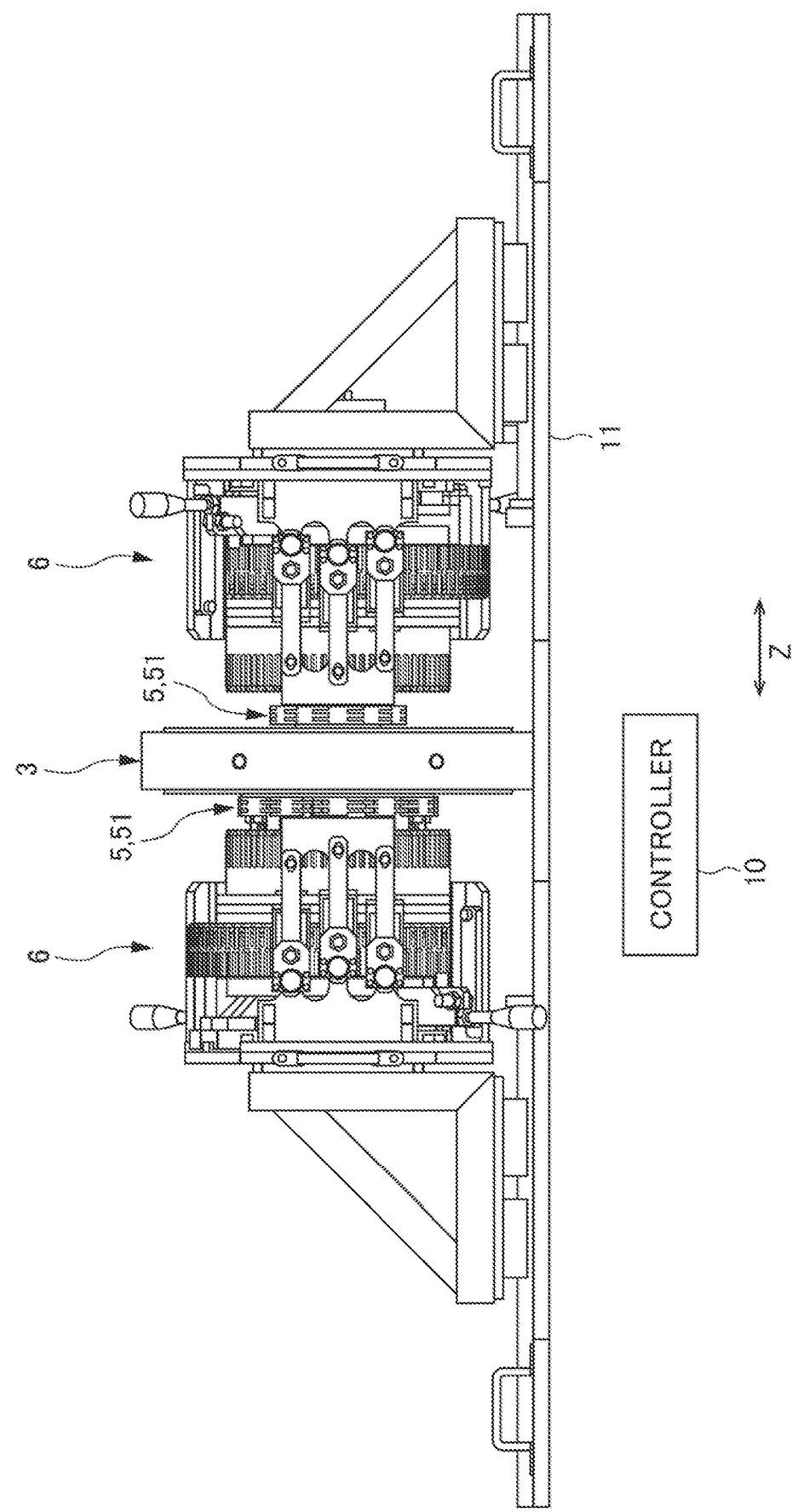
FIG. 1 is a side surface view that illustrates the appearance of a stator assembly apparatus.
Figure 2:
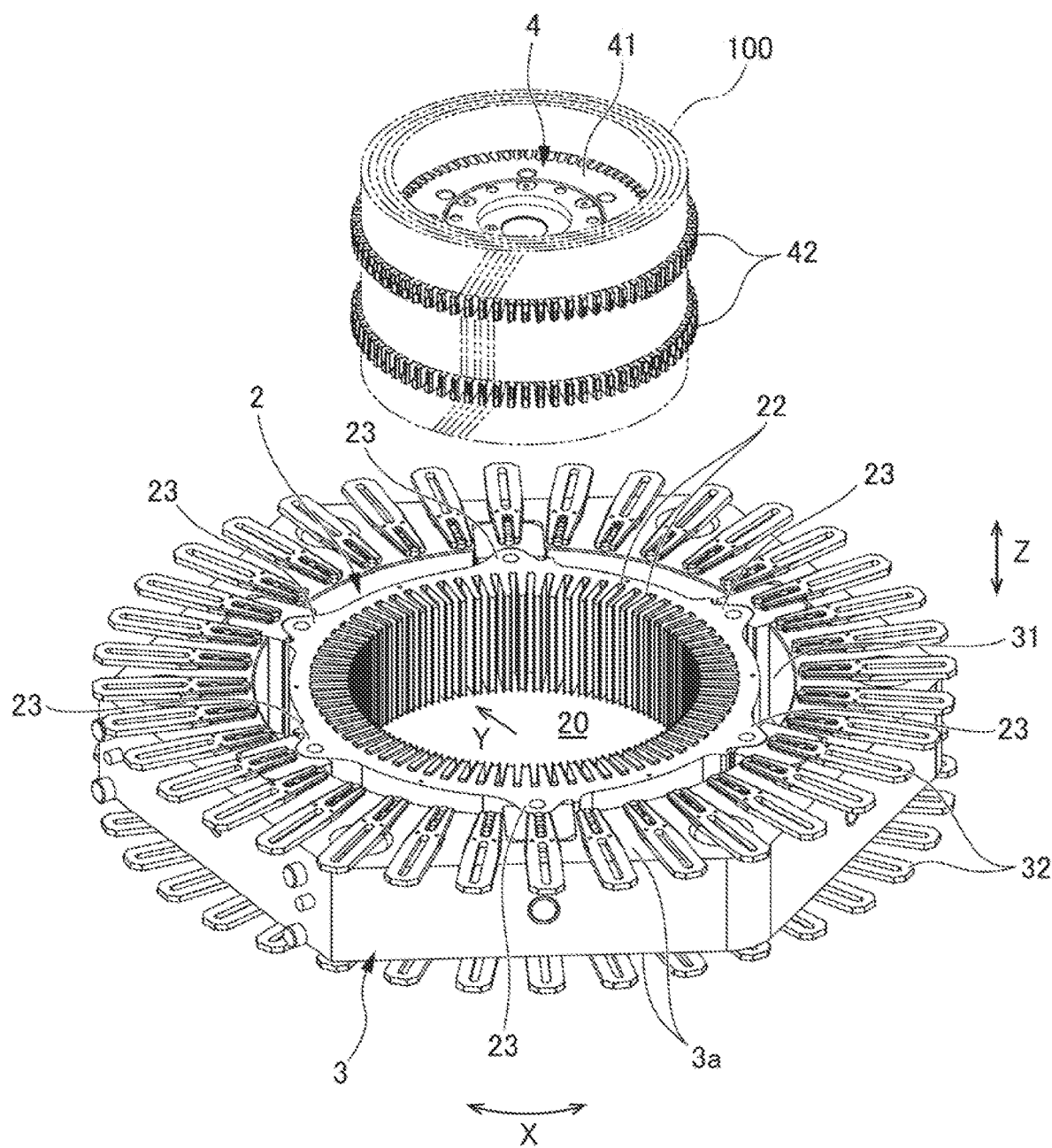
FIG. 2 is an exploded perspective view that illustrates a positioning jig and a coil winding jig in the stator assembly apparatus.

With reference to the drawings, description is given below in detail regarding an embodiment of the present invention. As illustrated in FIG. 1 and FIG. 2, a stator assembly apparatus 1 is provided with a stator core 2, a positioning jig 3 that positions and secures the stator core 2, a coil winding jig 4 on which a belt-shaped coil 100 has been wound into an annular shape, coil expansion mechanisms 5 for expanding the belt-shaped coil 100 wound onto the coil winding jig 4, and guide mechanisms 6 for guiding the insertion of the belt-shaped coil 100 into slots 22 in the stator core 2.

The stator core 2 has an annular section 21 that includes a laminate resulting from a plurality of thin core plates being laminated together, for example. At the center of the annular section 21 is a through hole 20 that penetrates therethrough in the axial direction. The stator core 2 has a plurality of slots 22 that penetrate therethrough in the axial direction of the stator core 2. The slots 22 are radially arranged at fixed intervals in the circumferential direction of the annular section 21 and have, radially inside the annular section 21, openings 22a that open toward the through hole 20. The stator core 2 according to the present embodiment has 72 slots 22. The outer periphery of the annular section 21 of the stator core 2 has six tabs 23 that protrude at fixed intervals.

Note that, as illustrated in FIG. 2, an X direction in which the slots 22 are arranged is a circumferential direction of the stator core 2 and the positioning jig 3, as illustrated in FIG. 2. A Y direction that follows radially from the center of the through hole 20 is a radial direction. A Z direction that is orthogonal to the X direction and the Y direction and follows the central shaft of the through hole 20 in the stator core 2 is a central axial direction.

As illustrated in FIG. 1 and FIG. 2, the positioning jig 3 is formed in a hexagonal prism shape having a dimension in the central axial direction approximately equal to the dimension of the stator core 2 in the central axial direction and has, at the center thereof, a stator core insertion hole 31 that enables the stator core 2 to be inserted and disposed. The positioning jig 3 supports each of the six tabs 23 belonging to the stator core 2 to thereby secure the stator core 2 at a predetermined position and orientation within the stator core insertion hole 31. In the stator assembly apparatus 1 according to the present embodiment, the positioning jig 3 is secured to the center of a base 11 belonging to the stator assembly apparatus 1 such that central axial direction of the stator core 2, having been secured within the stator core insertion hole 31, is the horizontal direction.

Figure 3:
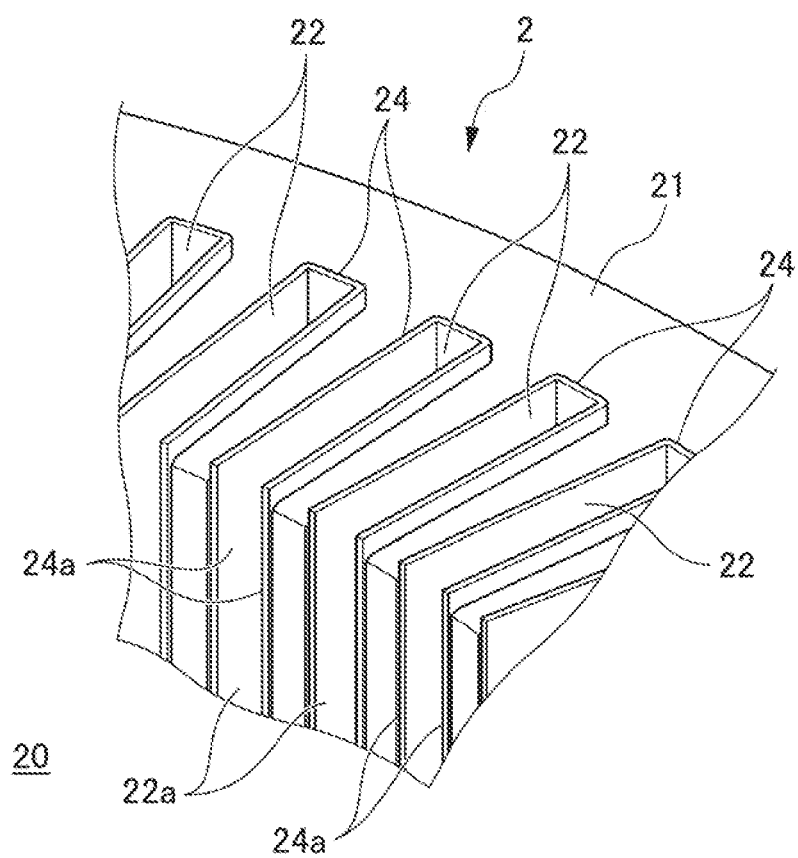
FIG. 3 is a perspective view that illustrates electrically-insulating members mounted to slots in a stator core.

Electrically-insulating paper 24 which is an electrically-insulating member is respectively mounted, in advance, to the slots 22 in the stator core 2, as illustrated in FIG. 3. Each electrically-insulating paper 24 is folded into an approximately square U-shape so as to follow the approximately square U-shaped inner shape of a corresponding slot 22 when the stator core 2 is seen from the axial direction. Each electrically-insulating paper 24 opens toward the through hole 20 radially inside the stator core 2. Each pair of opening ends 24a thereof is disposed at the opening 22a belonging to the corresponding slot 22, and open the inside of the electrically-insulating paper 24 toward the through hole 20.

As illustrated in FIG. 2, a plurality of cuff guides 32, each formed into a long and thin plate shape, are radially arranged at fixed intervals along the circumferential direction on both end surfaces 3a, 3a for the positioning jig 3 in the central axial direction. When inserting the later-described belt-shaped coil 100 into the slots 22 in the stator core 2, the cuff guides 32 support electrically-insulating paper 24 protruding from both end surfaces of the stator core 2 in the central axial direction while also guiding movement of the belt-shaped coil 100 into the slots 22. The cuff guides 32 are provided in a manner that enables the cuff guides 32 to undergo forward and backward movement in the radial direction with respect to the stator core 2, by being driven by actuators each of which is, inter alia, a cylinder and is not illustrated.

The coil winding jig 4 has an approximately cylindrical jig body 41 and a plurality of comb teeth 42 that radially protrude from the outer periphery of the jig body 41. The comb teeth 42 are respectively provided at both ends of the jig body 41 in the central axial direction. The number of inter-tooth spaces between the comb teeth 42, 42 that are respectively adjacent in the circumferential direction of the jig body 41 matches the number of slots 22 provided in the stator core 2. In order to be able to be inserted into the through hole 20 in the stator core 2, the coil winding jig 4 is formed such that the outer diameter of the coil winding jig 4, which is prescribed by the positions of the tips of the comb teeth 42, is less than or equal to the hole diameter of the through hole 20 in the stator core 2.

Figure 4:
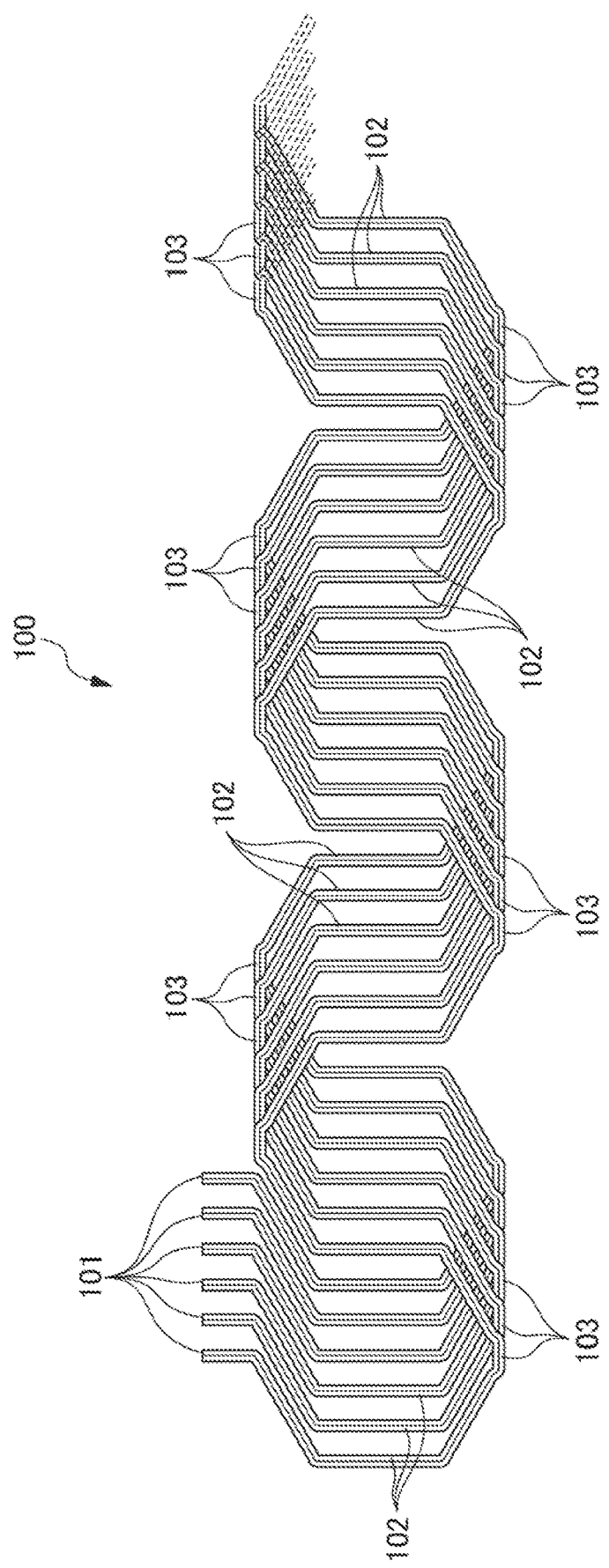
FIG. 4 is a developed view that illustrates an example of a coil.

The belt-shaped coil 100, which is to be mounted to the stator core 2, is wound into an annular shape onto the plurality of comb teeth 42 on the coil winding jig 4. As illustrated in FIG. 4, the belt-shaped coil 100 includes a long belt-shaped contiguous wave-wound coil formed by flat conductive wires 101 each having a cross-sectional shape that is approximately rectangular.

A contiguous wave-wound coil is the prevailing mainstream when setting a coil into a slot in a stator core and, because a technique for split molding the coil into a plurality of segments and welding coil ends after insertion into a slot is not required and, for example, there ceases to be a need to use high-purity copper material for the coil in order to be able to support thermal processing for welding locations. Accordingly, it is possible to use recycled copper material that includes impurities, and it is possible to contribute to realizing cyclical use of resources. Furthermore, because a wave-wound coil does not require welding, it is possible to reduce the weight of the coil, and it is possible to address a reduction of the weight of a rotary electrical machine that uses this coil. In a case where the rotary electrical machine is mounted in a hybrid car, the weight of the vehicle is reduced, whereby it is possible to reduce carbon dioxide and it is possible to reduce adverse effects on the global environment.

The belt-shaped coil 100 has a plurality of linear sections 102 and a plurality of coil ends 103. The linear sections 102 are locations that are inserted within slots 22 in the stator core 2, and are each disposed in parallel at fixed intervals extending approximately linearly. The coil ends 103 are each disposed at a position closer to the side ends of the belt-shaped coil 100 than the linear sections 102 and, along the lengthwise direction of the belt-shaped coil 100, alternatingly connect ends on one side for adjacent sets of linear sections 102 to each other and connect ends on the other side for adjacent sets of linear sections 102 to each other, the connecting having an approximately triangular mountain profile. The coil ends 103 respectively protrude from the slots 22 in the axial direction of the stator core 2 when the belt-shaped coil 100 has been mounted to the slots 22 in the stator core 2, and are locations pressed by the later-described coil expansion mechanism 5 when inserting the belt-shaped coil 100 into the slots 22.

The belt-shaped coil 100 according to the present embodiment is formed into a long belt shape by bundling six flat conductive wires 101, into which the plurality of linear sections 102 and the plurality of coil ends 103 have been respectively bent and formed, such that the linear sections 102 stand in a row in parallel at fixed intervals.

Before being inserted into the through hole 20 in the stator core 2, the coil winding jig 4 sequentially inserts, from the outside, the linear sections 102 in the belt-shaped coil 100 between comb teeth 42, 42 to thereby wind the belt-shaped coil 100 multiple times. As a result, the coil winding jig 4 onto which the belt-shaped coil 100 has been wound into an annular shape is configured, as illustrated in FIG. 2.

The coil winding jig 4, which is inserted into the through hole 20 inside the stator core 2, is held at a predetermined position and orientation due to being supported by a pair of coil expansion mechanisms 5 disposed facing each other on both sides of the stator core 2 in the central axial direction and sandwiching the positioning jig 3 therebetween.

Figure 5:
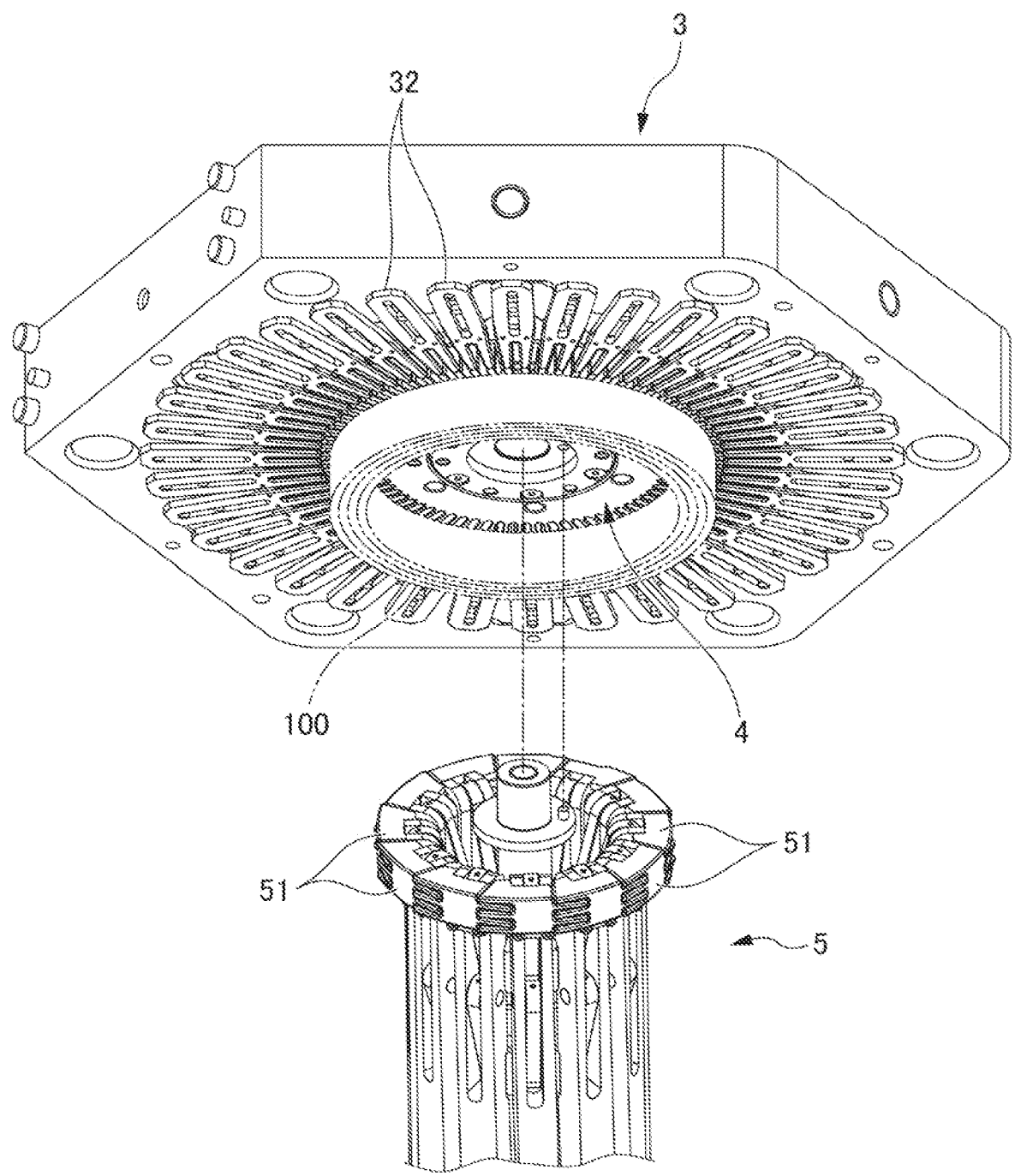
FIG. 5 is a perspective view that illustrate a situation in which a coil extending apparatus is mounted to a coil winding jig mounted inside the stator core.

The coil expansion mechanisms 5 according to the present embodiment have approximately cylindrical external shapes as illustrated in FIG. 5 and, with respect to the coil winding jig 4 inserted inside the stator core 2, are disposed facing each other in the central axial direction thereof as illustrated in FIG. 1. The coil expansion mechanisms 5 move linearly above the base 11 by being driven by actuators that are not illustrated, and are each provided in a manner that enables movement in a direction for coming into contact with the coil winding jig 4 and a direction for separating from the coil winding jig 4.

Each coil expansion mechanism 5 is formed in an approximately cylindrical shape, and has a plurality of coil pressing sections 51 on an outer periphery on the tip side thereof. The plurality of coil pressing sections 51 are arranged along the outer periphery on the tip side of the coil expansion mechanism 5, and are provided in a manner that enables diametrical expansion and diametrical reduction in the radial direction by being driven by actuators that are not illustrated. The outer diameter of the coil pressing sections 51 in a reduced-diameter state is less than or equal to the inner diameter of the annular belt-shaped coil 100 wound onto the coil winding jig 4. The outer diameter of the coil pressing sections 51 in an expanded-diameter state is greater than the outer diameter of the coil winding jig 4.

The coil expansion mechanisms 5 hold the coil winding jig 4 by the coil pressing sections 51 in the reduced-diameter state being inserted inside the annular belt-shaped coil 100 wound onto the coil winding jig 4. When the coil pressing sections 51 inserted inside the belt-shaped coil 100 undergo diametrical expansion, the belt-shaped coil 100 is pressed outward and undergoes diametrical expansion. As a result, the linear sections 102 of the belt-shaped coil 100 move toward inside the electrically-insulating papers 24 within the slots 22 that are disposed radially outside, and are inserted inside the slots 22. The coil pressing sections 51 in the coil expansion mechanisms 5 configure a pressing means that presses to belt-shaped coil 100 radially outward to thereby cause the linear sections 102 in the belt-shaped coil 100 to move inside the electrically-insulating papers 24 inside the slots 22.

As illustrated in FIG. 1, the guide mechanisms 6 are, similarly to the coil expansion mechanisms 5, disposed in a pair so as to face each other on both sides of the stator core 2 in the central axial direction, sandwiching the positioning jig 3 therebetween. The pair of guide mechanisms 6 are each disposed concentrically with the outer peripheral sides of the coil expansion mechanisms 5.

Figure 6:
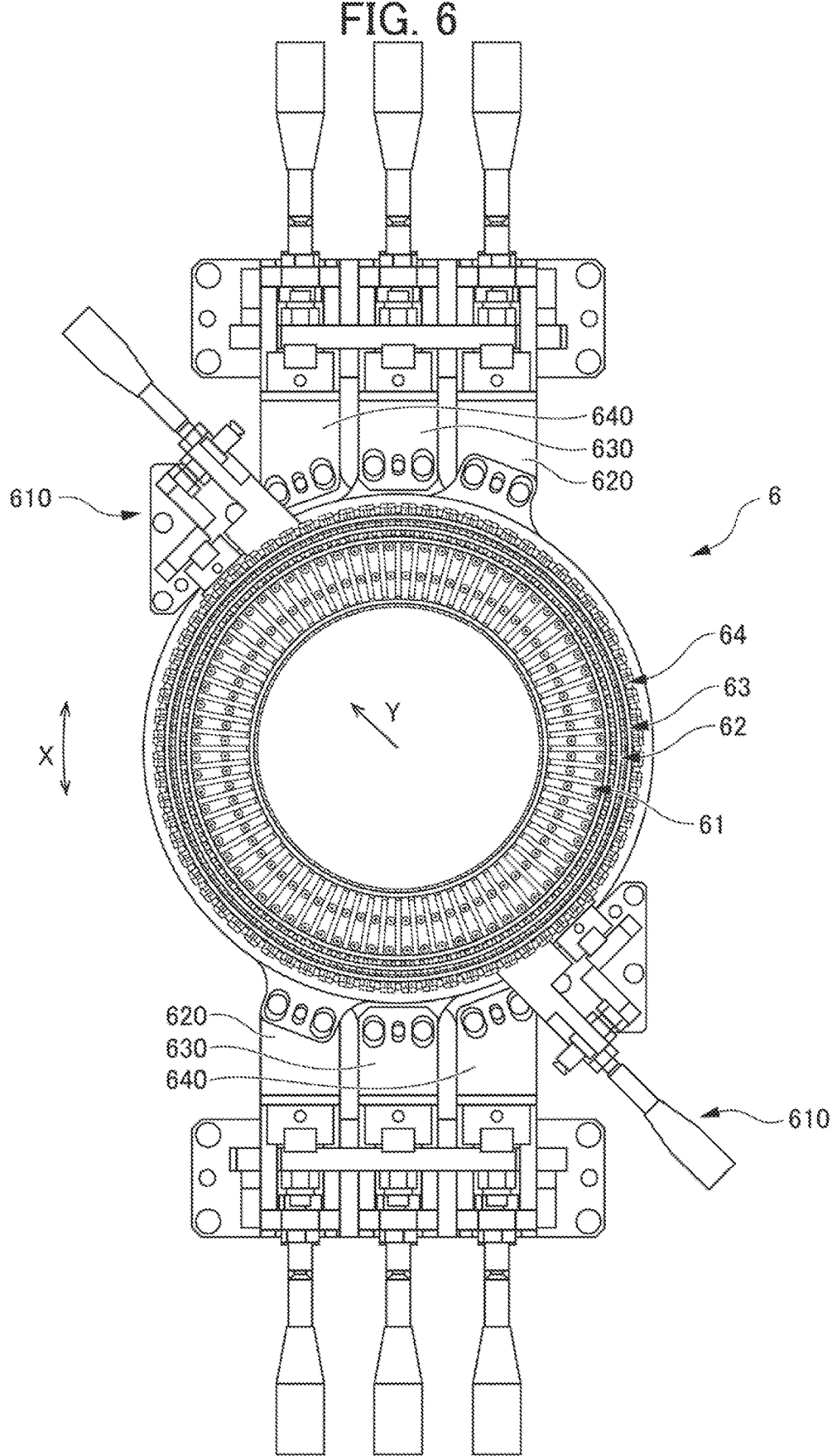
FIG. 6 is a view in which a guide mechanism in the stator assembly apparatus is seen from a central axial direction.
Figure 7:
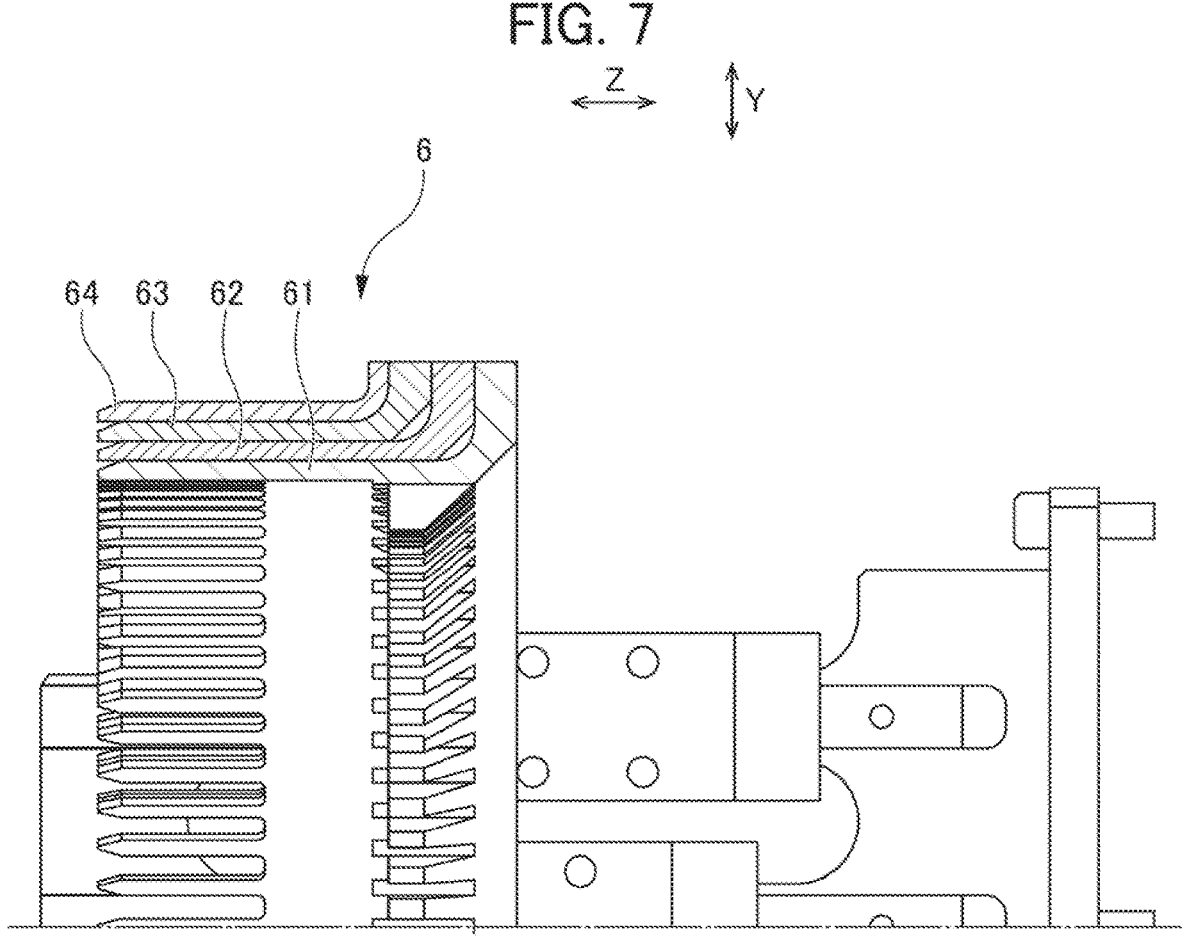
FIG. 7 is a cross-sectional view that illustrates guide members in the guide mechanism.
Figure 8:
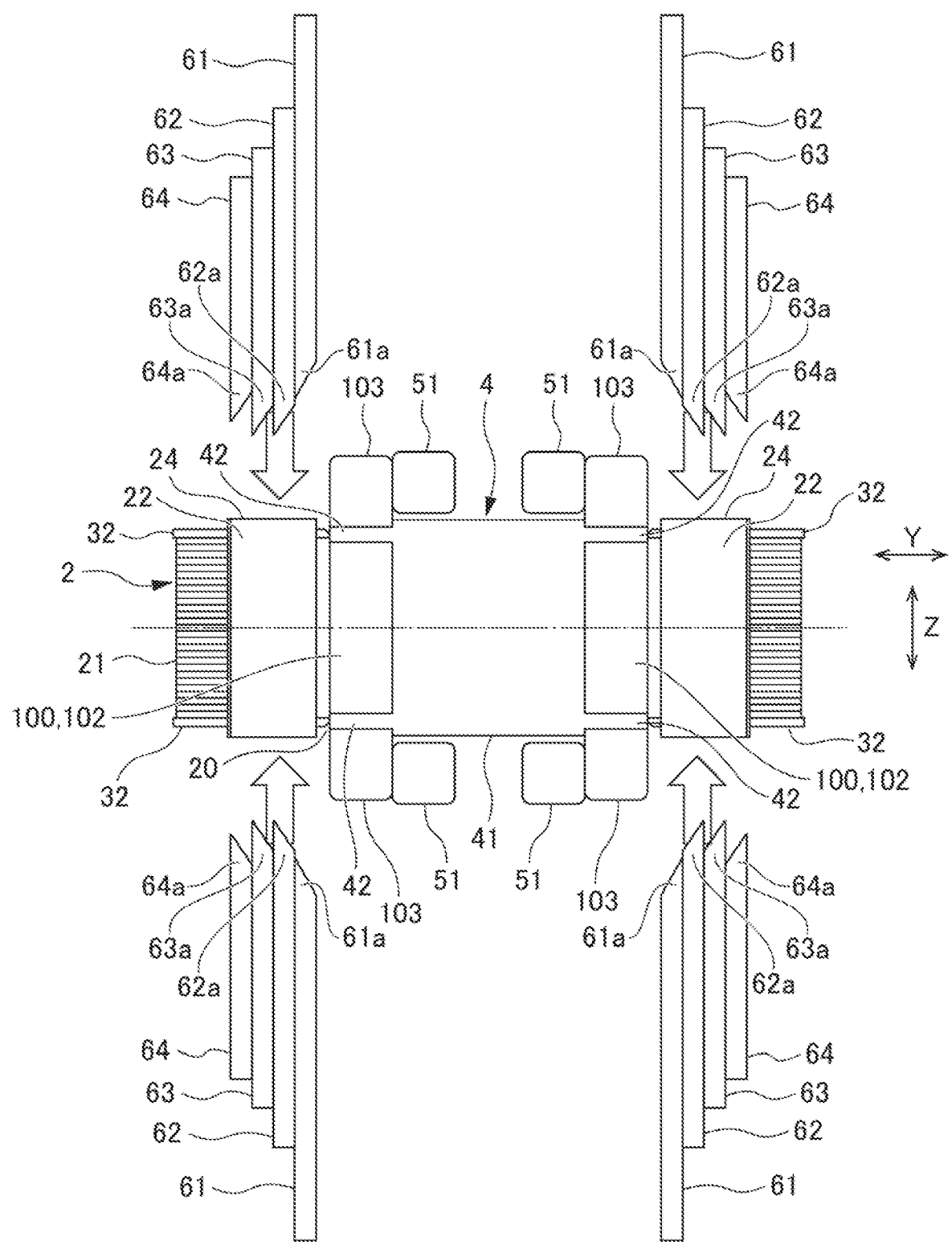
FIG. 8 is a schematic view that illustrates a situation in which guide members are inserted into slots in the stator core.

Because the pair of guide mechanisms 6 have the same configuration, description is given regarding the configuration of one guide mechanism 6, with reference to FIG. 6 through FIG. 8. FIG. 6 is a view in which one guide mechanism 6 is seen from a direction that follows the central axial direction of the stator core 2. The guide mechanism 6 has a plurality of guide members 61, 62, 63, and 64 arranged in annular shapes, and a plurality of actuators 610, 620, 630, and 640 which are movement mechanisms for respectively causing the plurality of guide members to individually move.

Each of the plurality of guide members 61, 62, 63, and 64 includes a rod having a length that can be inserted, following the central axial direction of the stator core 2, inside electrically-insulating paper 24 mounted inside a slot 22. Respective tip ends 61a, 62a, 63a, and 64a are formed into tapered shapes (refer to FIG. 8). Cross-sections orthogonal to the longitudinal direction of the guide members 61, 62, 63, and 64 form quadrilaterals having rounded corners, except for the tip ends 61a, 62a, 63a, and 64a (refer to FIG. 10A).

Vertical widths W1 (refer to FIG. 10A) of the guide members 61, 62, 63, and 64 in the radial direction of the stator core 2 are respectively the same width. This vertical width W1 is sufficiently smaller than the depth of slots 22 in the radial direction of the stator core 2. In the present embodiment, the vertical width W1 of each of the guide members 61, 62, 63, and 64 is set to approximately ¼ of the depth of the slots 22. A specific dimension for the vertical width W1 is set, as appropriate, in accordance with, inter alia, a specification for the slots 22 and the type of the electrically-insulating paper 24 and is not particularly limited, but is set to 4.2 mm in the present embodiment.

Horizontal widths W2 (refer to FIG. 10A) of the guide members 61, 62, 63, and 64 in the circumferential direction of the stator core 2 are respectively the same width. This horizontal width W2 is greater than or equal to a width W0 (refer to FIG. 10A), in the circumferential direction of the stator core 2, for linear sections 102 in the belt-shaped coil 100 to be inserted into the slots 22. However, this horizontal width W2 is less than or equal to the width, in the circumferential direction of the stator core 2, inside the electrically-insulating papers 24 mounted inside the slots 22.

The guide members respectively provided on the pair of guide mechanisms 6 respectively correspond to all of the slots 22 in the stator core 2. In the present embodiment, one guide mechanism 6 is provided with four guide members-first through fourth guide members 61, 62, 63, and 64—for each slot 22. Accordingly, due to the pair of guide mechanisms 6, eight guide members 61, 62, 63, and 64 are correspondingly disposed for one slot 22.

The guide members that correspond to one slot 22 and are provided on one guide mechanism 6 are configured by a first guide member 61 disposed most radially inside, a second guide member 62 disposed radially outside the first guide member 61, a third guide member 63 disposed radially outside the second guide member 62, and a fourth guide member 64 disposed most radially outside. However, it is sufficient if there is a plurality of guide members for each slot 22 disposed in the radial direction of the stator core 2. The number of guide members is set, as appropriate, in accordance with, inter alia, the specification of the slots 22 and the type of the electrically-insulating paper 24, and is not limited to four.

The first guide member 61, the second guide member 62, the third guide member 63, and the fourth guide member 64 are each arranged in an annular shape at the same arrangement pitch as the arrangement pitch for the slots 22, and are stacked in the radial direction with substantially no gaps therebetween. The first guide member 61, the second guide member 62, the third guide member 63, and the fourth guide member 64 are individually connected to the actuators 610, 620, 630, and 640, which are for driving respectively corresponding guide members. The first guide member 61, the second guide member 62, the third guide member 63, and the fourth guide member 64 are provided in a manner that enables individual movement in the central axial direction of the stator core 2, in accordance with being driven by the actuators 610, 620, 630, and 640. The actuators 610, 620, 630, and 640 are each individually controlled by a controller 10 for the stator assembly apparatus 1 illustrated in FIG. 1. The controller 10 corresponds to a controller according to the present disclosure. The controller 10 is provided with a memory and a processor that are not illustrated, and a program for controlling driving by the actuators 610, 620, 630, and 640 is saved in the memory.

When the actuators 610, 620, 630, and 640 perform driving, a corresponding first guide member 61, second guide member 62, third guide member 63, and fourth guide member 64 are each individually caused to move, following the central axial direction of the stator core 2, in a direction toward the stator core 2 and in a direction away from the stator core 2. By the first guide member 61, second guide member 62, third guide member 63, and fourth guide member 64 moving in the direction toward the stator core 2, the first guide member 61, second guide member 62, third guide member 63, and fourth guide member 64 are inserted, from the central axial direction of the stator core 2, inside the electrically-insulating paper 24 inside a respectively corresponding slot 22. By the first guide member 61, second guide member 62, third guide member 63, and fourth guide member 64 moving in the direction away from the stator core 2, the first guide member 61, second guide member 62, third guide member 63, and fourth guide member 64 are withdrawn by being separately removed outwardly, in the central axial direction of the stator core 2, from inside the electrically-insulating paper 24 inside the respectively corresponding slot 22. However, all of the first guide member 61, the second guide member 62, the third guide member 63, and the fourth guide member 64 substantially do not move in the radial direction of the stator core 2.

Next, description is given regarding an operation (stator assembly method) for accommodating the linear sections 102 in the belt-shaped coil 100 inside electrically-insulating papers 24 within the slots 22 in the stator core 2, in the stator assembly apparatus 1. FIG. 8 and FIG. 9A through FIG. 9J schematically illustrate an operation process for inserting the belt-shaped coil 100, which has been wound onto the coil winding jig 4, inside the electrically-insulating papers 24 within the slots 22 in the stator core 2, from inside the stator core 2. Because the operation process advances at the same time on both sides of the stator core 2 in the central axial direction, FIG. 9A through FIG. 9J illustrate the operation process for only one side of the stator core 2 in the central axial direction. FIG. 10A through FIG. 10J schematically illustrate the first guide member 61, the second guide member 62, the third guide member 63, and the fourth guide member 64 within one slot 22 in the stator core 2. FIG. 10A through FIG. 10J temporally correspond to FIG. 9A through FIG. 9J. Note that illustration of the positioning jig 3 is omitted in FIG. 8, FIG. 9A through FIG. 9J, and FIG. 10A through FIG. 10J.

Firstly, as illustrated in FIG. 8, after the coil winding jig 4 onto which the belt-shaped coil 100 has been wound is supported within the through hole 20 in the stator core 2 by the coil expansion mechanisms 5, all of the first guide member 61, second guide member 62, third guide member 63, and fourth guide member 64 are inserted inside the electrically-insulating paper 24 within a respective slot 22, from outside on both sides in the central axial direction of the stator core 2 (insertion step).

The pair of guide mechanisms 6 insert each of the first guide member 61, second guide member 62, third guide member 63, and fourth guide member 64 from outside on both sides in the central axial direction of the stator core 2, and thus it is sufficient for a travel distance for each of the first guide member 61, second guide member 62, third guide member 63, and fourth guide member 64 in the central axial direction of the stator core 2 to be one half.

The tip ends 61a, 62a, 63a, and 64a of respective guide members 61, 62, 63, and 64 inserted inside the electrically-insulating paper 24 inside a slot 22 are disposed facing each other within the slot 22.

Figure 9A:
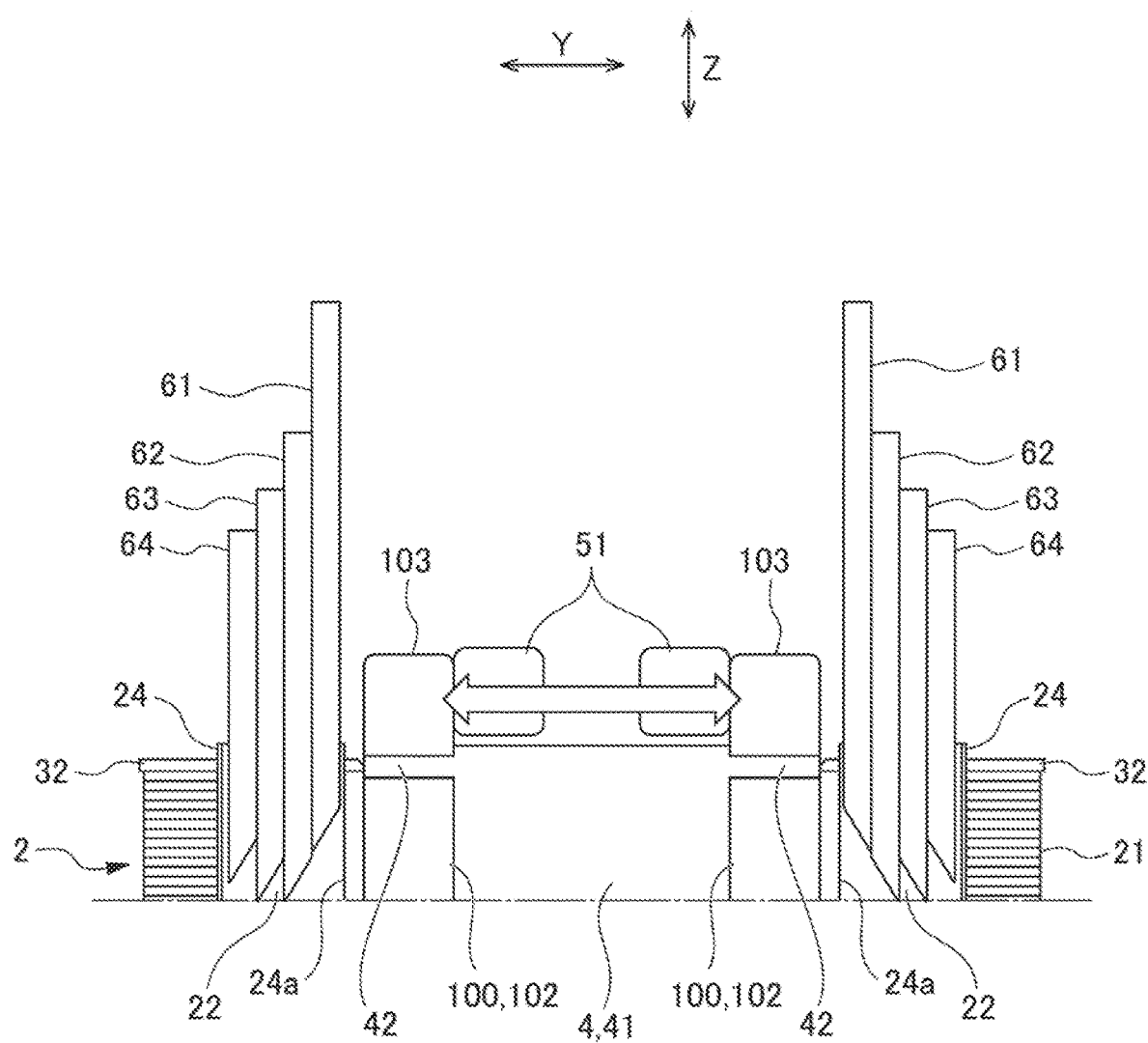
FIG. 9A is a schematic view for describing an operation process for inserting coils into slots from inside the stator core.
Figure 10A:
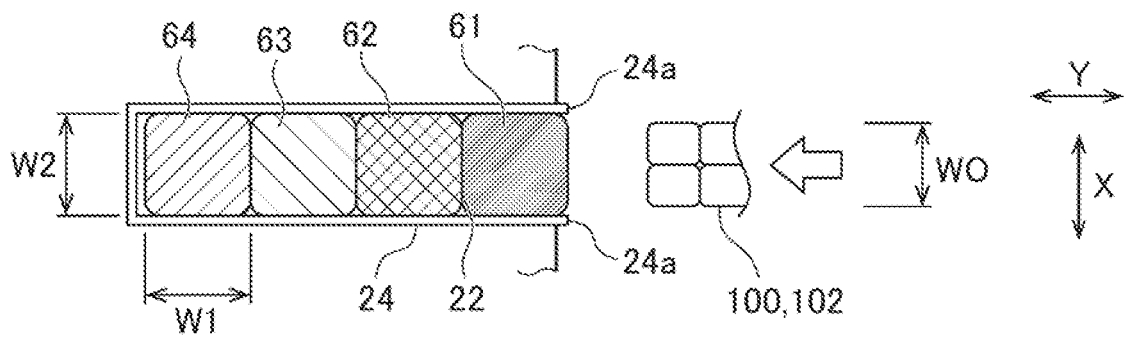
FIG. 10A is a schematic view that illustrates a situation in which a coil is inserted into a slot.

In a state immediately after the first guide member 61, second guide member 62, third guide member 63, and fourth guide member 64 are inserted inside the electrically-insulating paper 24 inside a slot 22, it is desirable that the first guide member 61, which is disposed most radially inside with respect to the stator core 2, is disposed within the slot 22 in a state of being hung within the opening ends 24a for the electrically-insulating paper 24, as illustrated in FIG. 9A and FIG. 10A. In other words, the first guide member 61 is disposed between the pair of opening ends 24a for the electrically-insulating paper 24. The second guide member 62, third guide member 63, and fourth guide member 64 are disposed within the slot 22 in a stacked state radially outside the first guide member 61 (deep side of the slot 22).

Thus, a state where the first guide member 61, second guide member 62, third guide member 63, and fourth guide member 64 are inserted inside the electrically-insulating paper 24 within the slot 22 is close to a state in which the linear sections 102 of the belt-shaped coil 100 is accommodated inside the electrically-insulating paper 24. Accordingly, the shape of the electrically-insulating paper 24 before the linear sections 102 of the belt-shaped coil 100 are inserted is held in an appropriate shape before the belt-shaped coil 100 is inserted. The first guide member 61 is disposed within the slot 22 in a state where the first guide member 61 is hung within the opening ends 24a belonging to the electrically-insulating paper 24, whereby it is possible to hold the opening ends 24a belonging to the electrically-insulating paper 24 in an open state before the belt-shaped coil 100 is inserted. As a result, the opening ends 24a of the electrically-insulating paper 24 coming into contact with the belt-shaped coil 100 which moves into the slot 22 to thereby buckle or the like is suppressed, and thus it is possible to smoothly introduce the belt-shaped coil 100 inside the electrically-insulating paper 24.

After completing insertion of the first guide members 61, second guide members 62, third guide members 63, and fourth guide members 64, the controller 10 causes the coil expansion mechanisms 5 to operate, and causes the coil pressing sections 51 to diametrically expand in the directions of the hollow arrow illustrated in FIG. 9A. As a result, the coil ends 103 in the belt-shaped coil 100 wound onto the coil winding jig 4 are pressed by the coil pressing sections 51 which diametrically expand, and move radially outward with respect to the stator core 2. In conjunction with this movement, the belt-shaped coil 100 gradually undergoes diametrical expansion, and the linear sections 102 gradually move toward the inside of the electrically-insulating papers 24 within the slots 22 (first movement step; FIG. 9A and FIG. 10A).

Figure 9B:
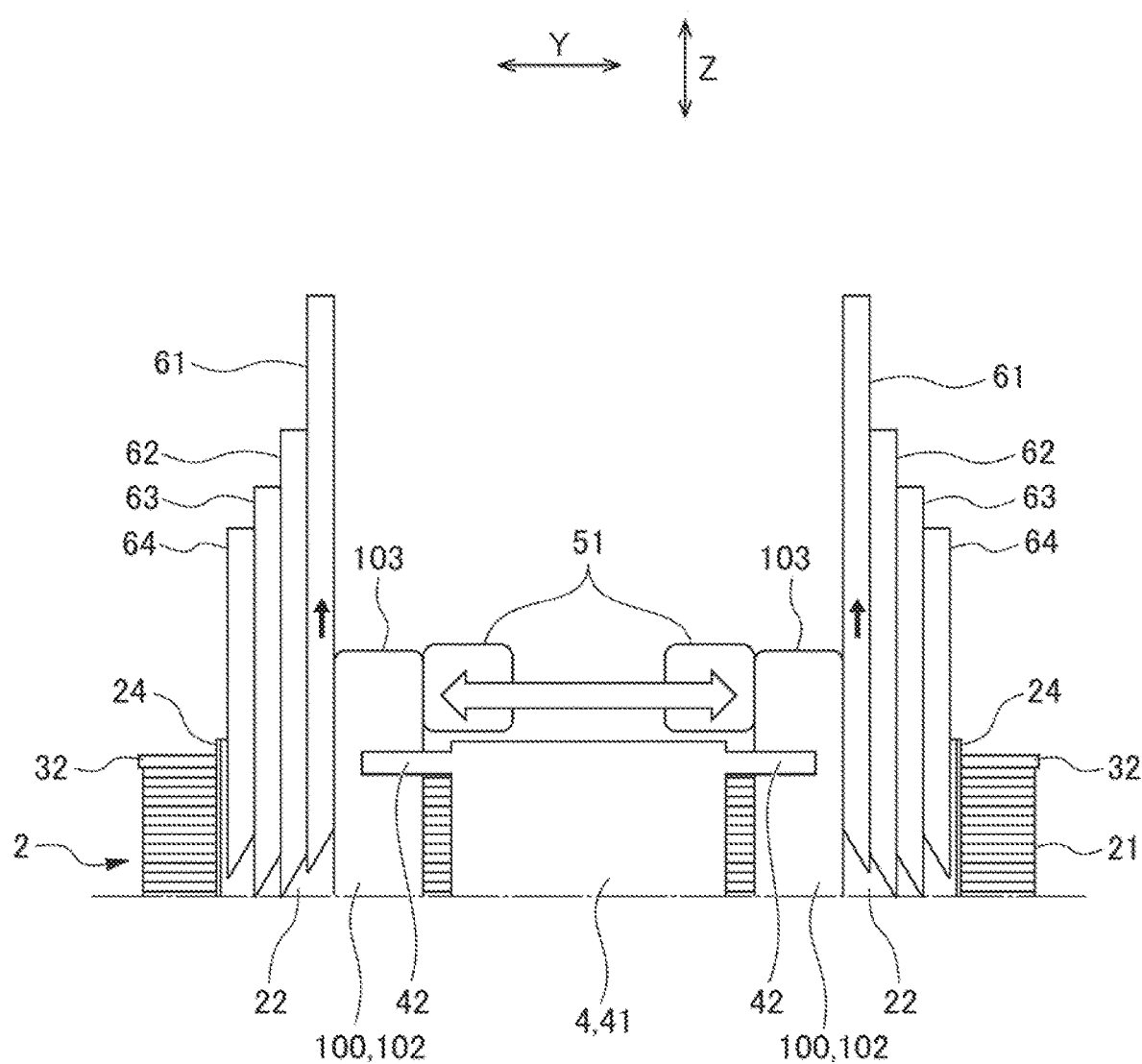
FIG. 9B is a schematic view for describing the operation process for inserting coils into slots from inside the stator core.
Figure 10B:
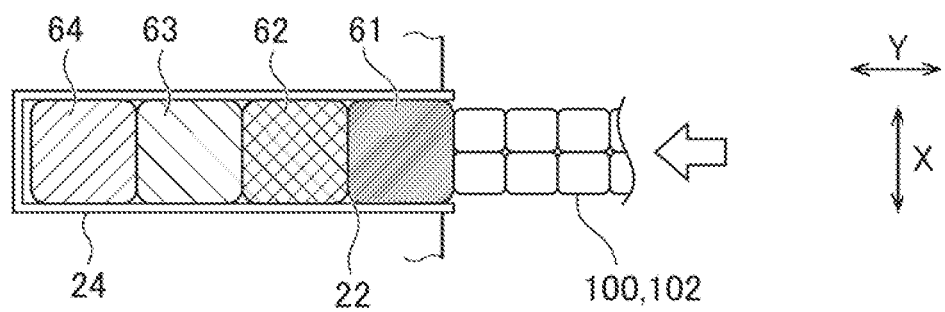
FIG. 10B is a schematic view that illustrates a situation in which a coil is inserted into a slot.

The diametrically expanded belt-shaped coil 100 eventually comes into contact with or approaches the first guide members 61, which are disposed in front of the linear sections 102 in the belt-shaped coil 100 in the direction of movement (FIG. 9B and FIG. 10B).

When the linear sections 102 in the belt-shaped coil 100 come into contact with or approach the first guide members 61, the controller 10 causes the actuators 610 corresponding to the first guide members 61 to perform driving to thereby cause the first guide members 61 to move outward in the central axial direction of the stator core 2. As a result, the first guide members 61 are removed from within the slots 22, and withdraw from inside the electrically-insulating papers 24 (first withdrawal step).

Figure 9C:
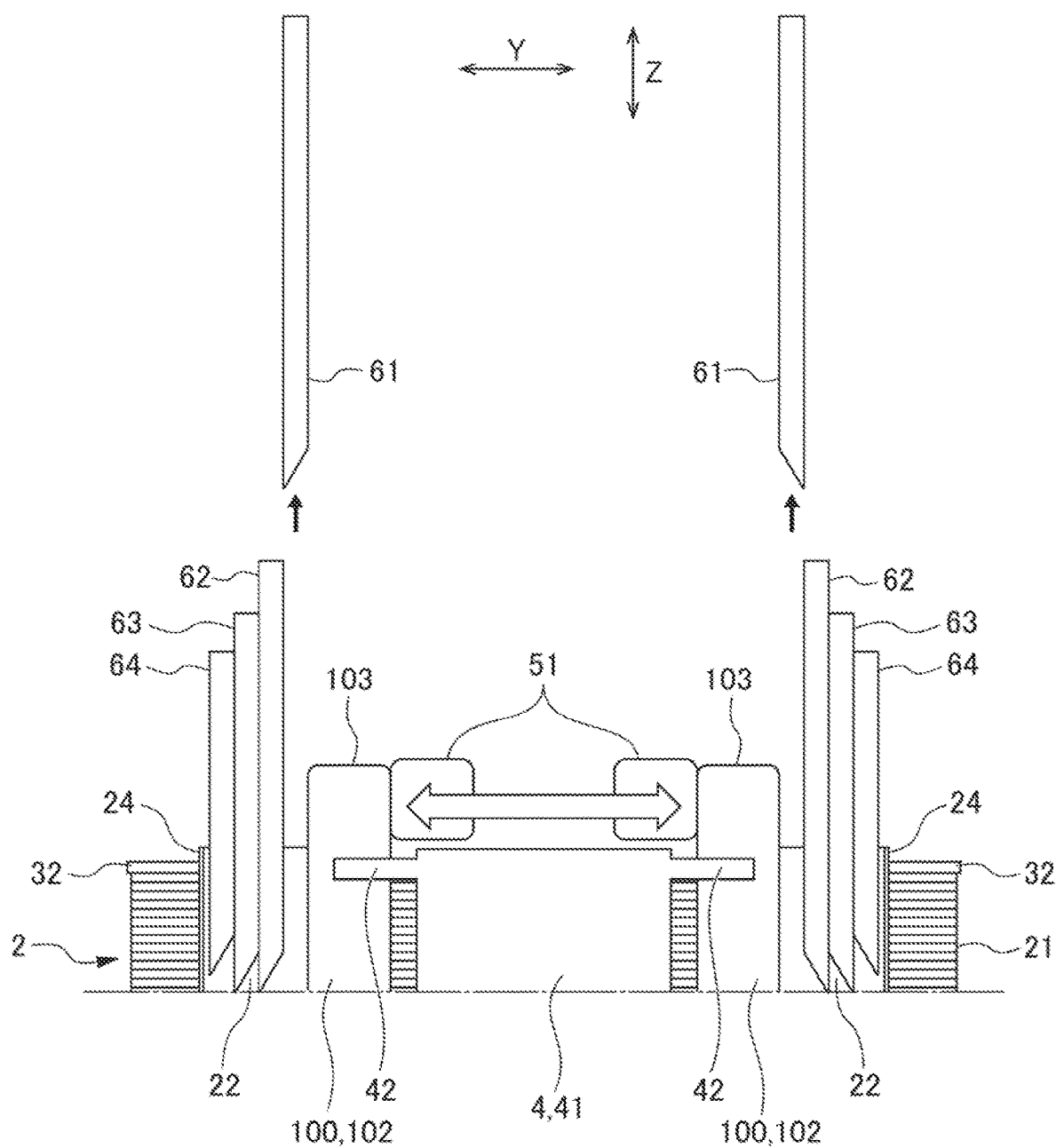
FIG. 9C is a schematic view for describing the operation process for inserting coils into slots from inside the stator core.
Figure 10C:
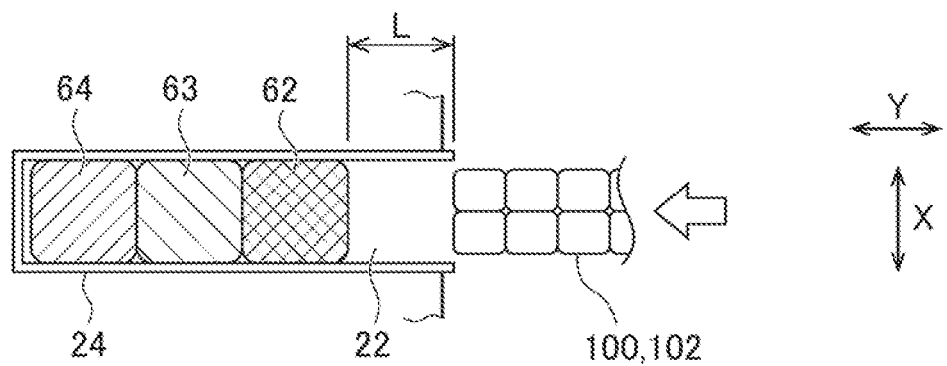
FIG. 10C is a schematic view that illustrates a situation in which a coil is inserted into a slot.

After the first guide members 61 are withdrawn, the linear sections 102 in the belt-shaped coil 100 are separated from the second guide members 62, which remain on the most inner diameter sides within the slots 22, by a distance L corresponding to the vertical width W1 of each first guide member 61 (FIG. 9C, FIG. 10C).

Figure 9D:
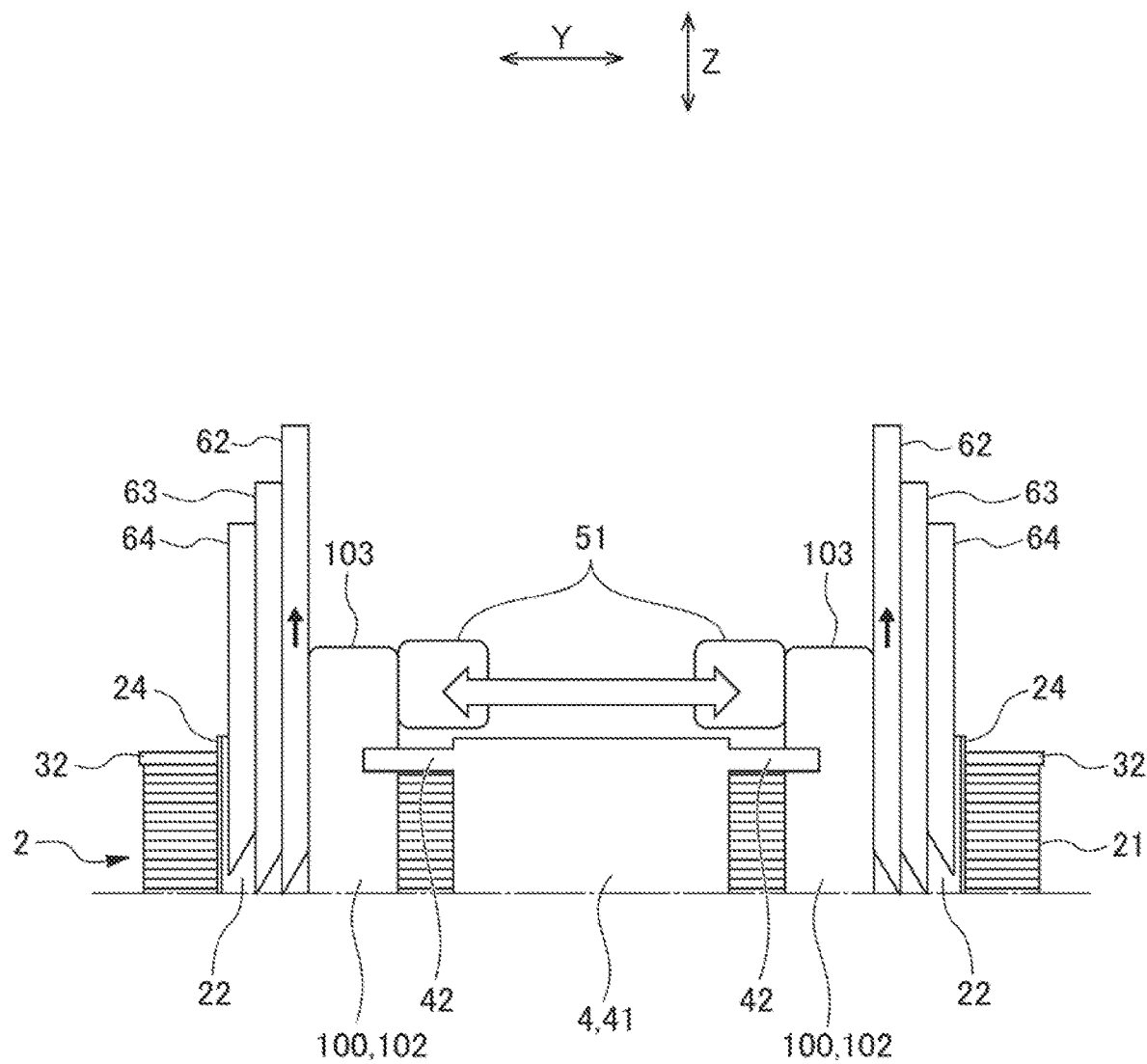
FIG. 9D is a schematic view for describing the operation process for inserting coils into slots from inside the stator core.
Figure 10D:
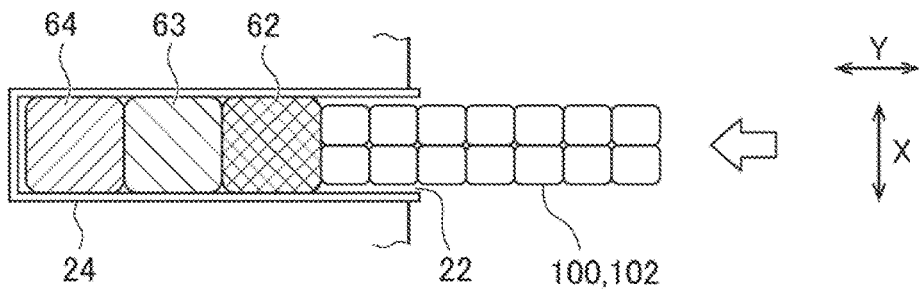
FIG. 10D is a schematic view that illustrates a situation in which a coil is inserted into a slot.

In conjunction with the belt-shaped coil 100 further diametrically expanding, the linear sections 102 in the belt-shaped coil 100 move radially outward such that the distance L to the second guide members 62 shrinks, and eventually come into contact with or approach the second guide members 62 (second movement step; FIG. 9D, FIG. 10D).

When the linear sections 102 in the belt-shaped coil 100 come into contact with or approach the second guide members 62, the controller 10 causes the actuators 620 corresponding to the second guide members 62 to perform driving to thereby cause the second guide members 62 to move outward in the central axial direction of the stator core 2. As a result, the second guide members 62 are withdrawn from inside the electrically-insulating papers 24 within the slots 22 (second withdrawal step).

Figure 9E:
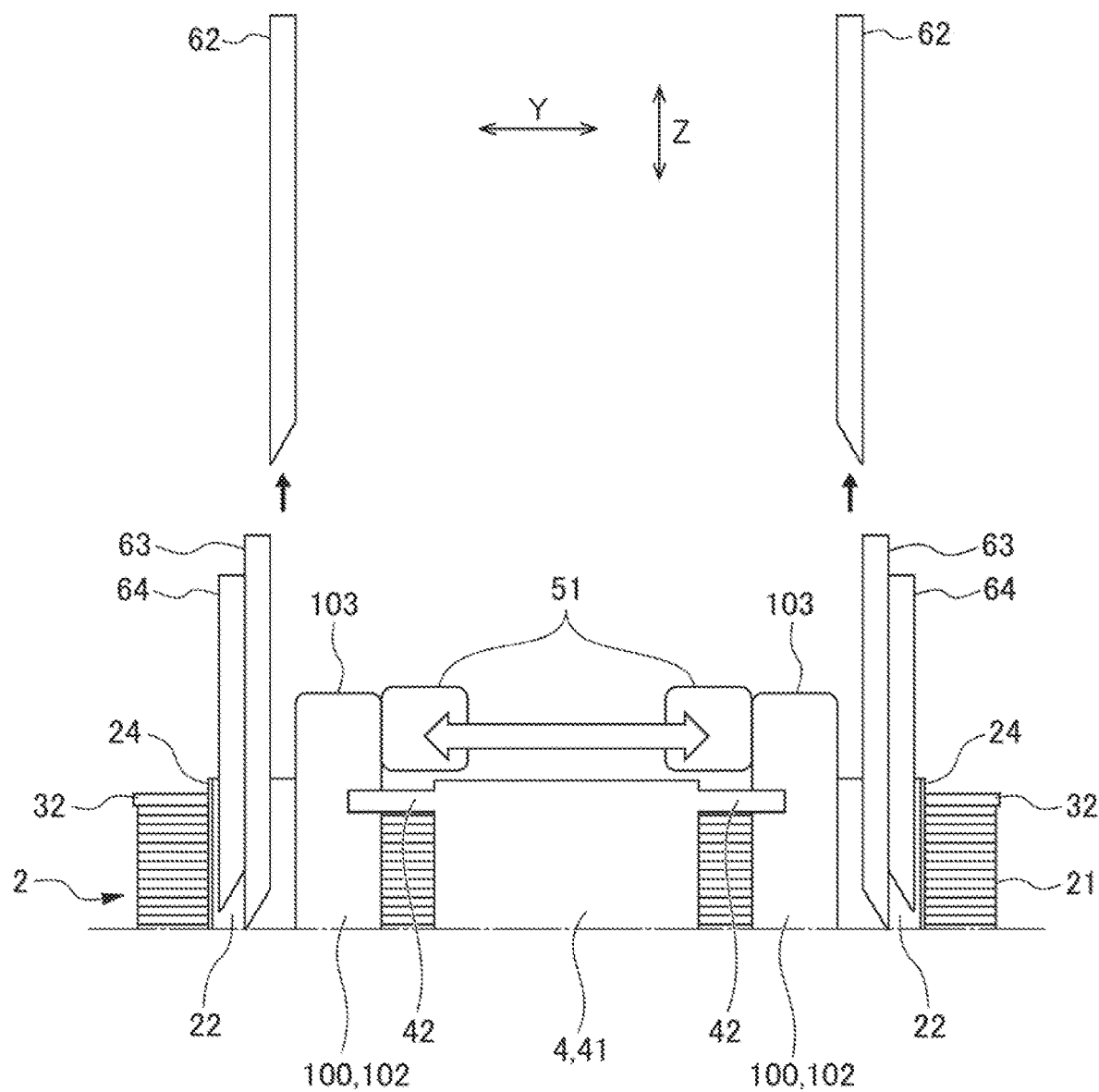
FIG. 9E is a schematic view for describing the operation process for inserting coils into slots from inside the stator core.
Figure 10E:
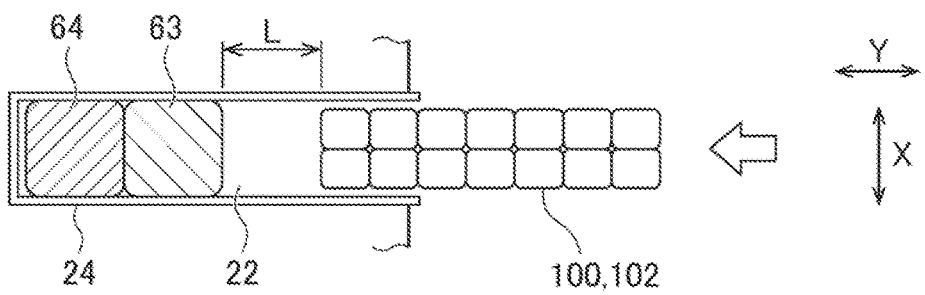
FIG. 10E is a schematic view that illustrates a situation in which a coil is inserted into a slot.

After the second guide members 62 are withdrawn, the linear sections 102 in the belt-shaped coil 100 are separated from the third guide members 63, which remain on the most inner diameter sides within the slots 22, by a distance L corresponding to the vertical width W1 of each second guide member 62 (FIG. 9E, FIG. 10E).

Figure 9F:
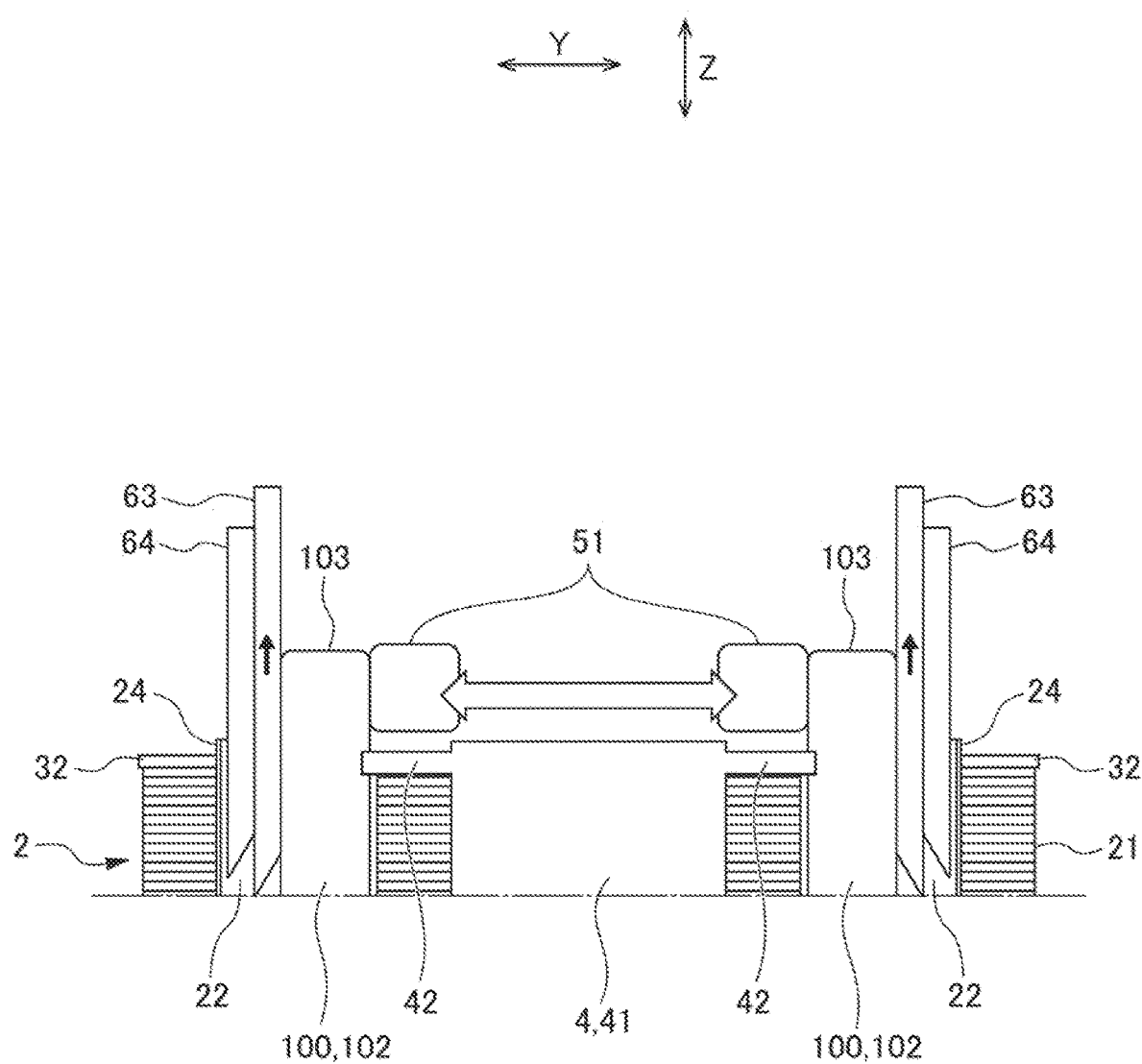
FIG. 9F is a schematic view for describing the operation process for inserting coils into slots from inside the stator core.
Figure 10F:
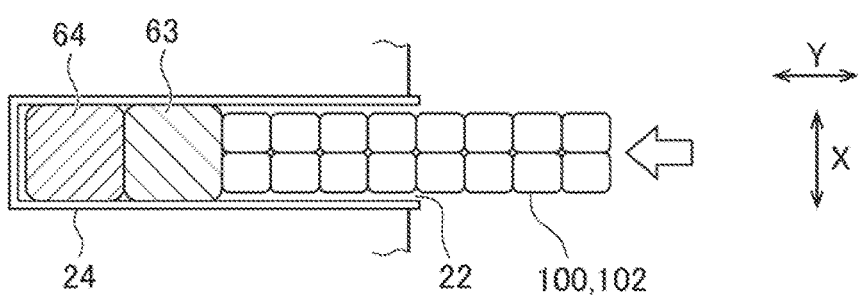
FIG. 10F is a schematic view that illustrates a situation in which a coil is inserted into a slot.

In conjunction with the belt-shaped coil 100 further diametrically expanding, the linear sections 102 in the belt-shaped coil 100 move radially outward such that the distance L to the third guide members 63 shrinks, and eventually come into contact with or approach the third guide members 63 (third movement step; FIG. 9F, FIG. 10F).

When the linear sections 102 in the belt-shaped coil 100 come into contact with or approach the third guide members 63, the controller 10 causes the actuators 630 corresponding to the third guide members 63 to perform driving to thereby cause the third guide members 63 to move outward in the central axial direction of the stator core 2. As a result, the third guide members 63 are withdrawn from inside the electrically-insulating papers 24 within the slots 22 (third withdrawal step).

Figure 9G:
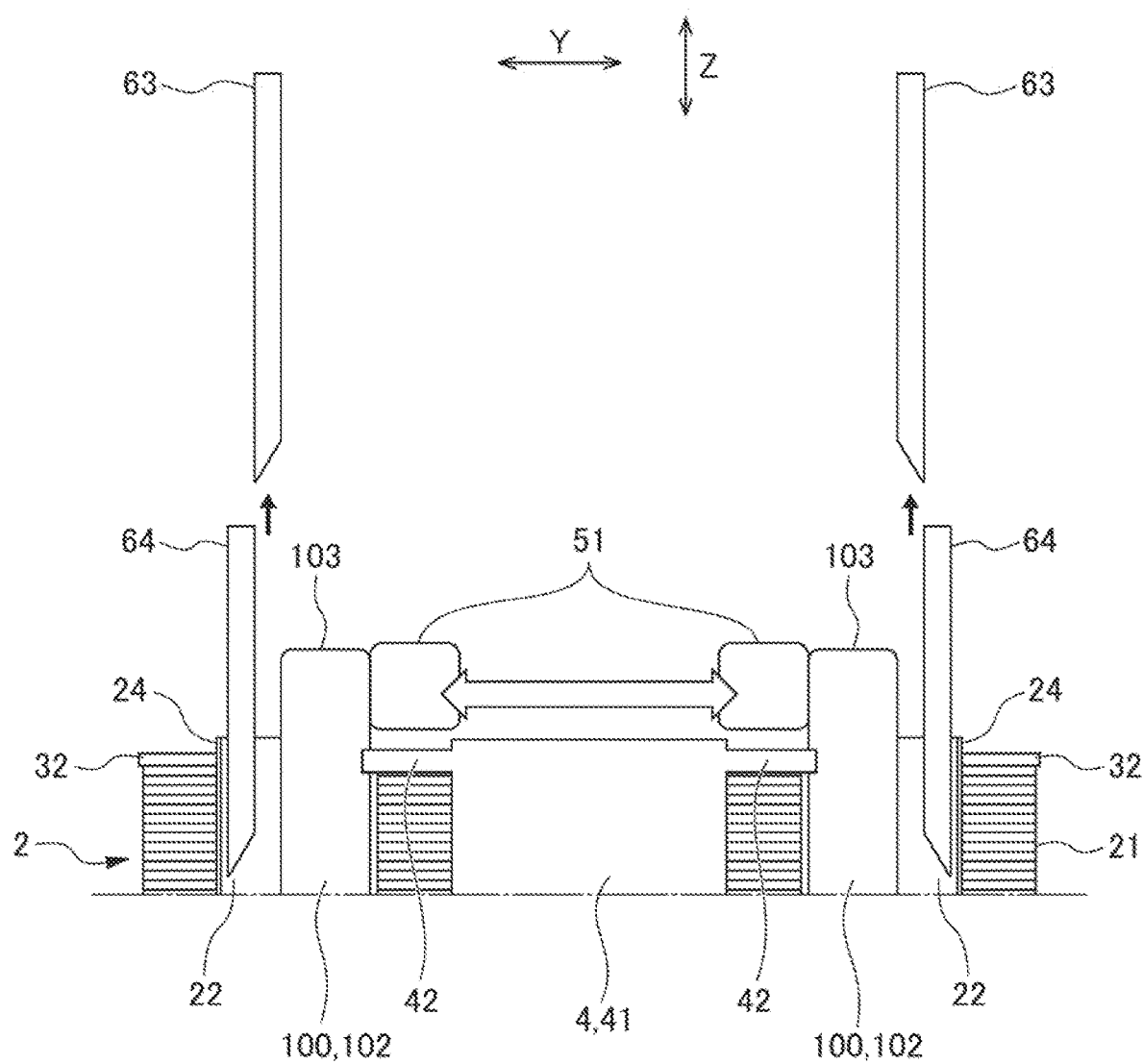
FIG. 9G is a schematic view for describing the operation process for inserting coils into slots from inside the stator core.
Figure 10G:
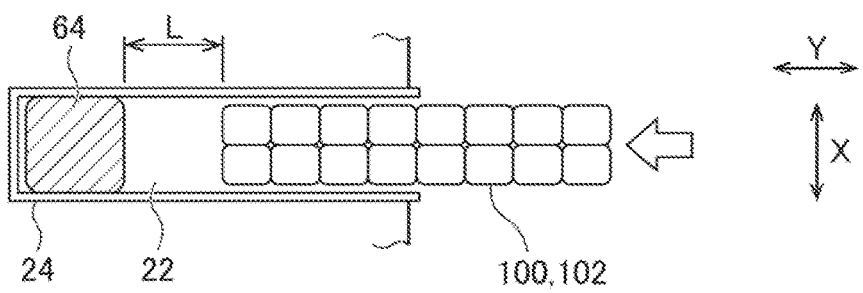
FIG. 10G is a schematic view that illustrates a situation in which a coil is inserted into a slot.

After the third guide members 63 are withdrawn, the linear sections 102 in the belt-shaped coil 100 are separated from the fourth guide members 64, which remain within the slots 22, by a distance L corresponding to the vertical width W1 of each third guide member 63 (FIG. 9G, FIG. 10G).

Figure 9H:
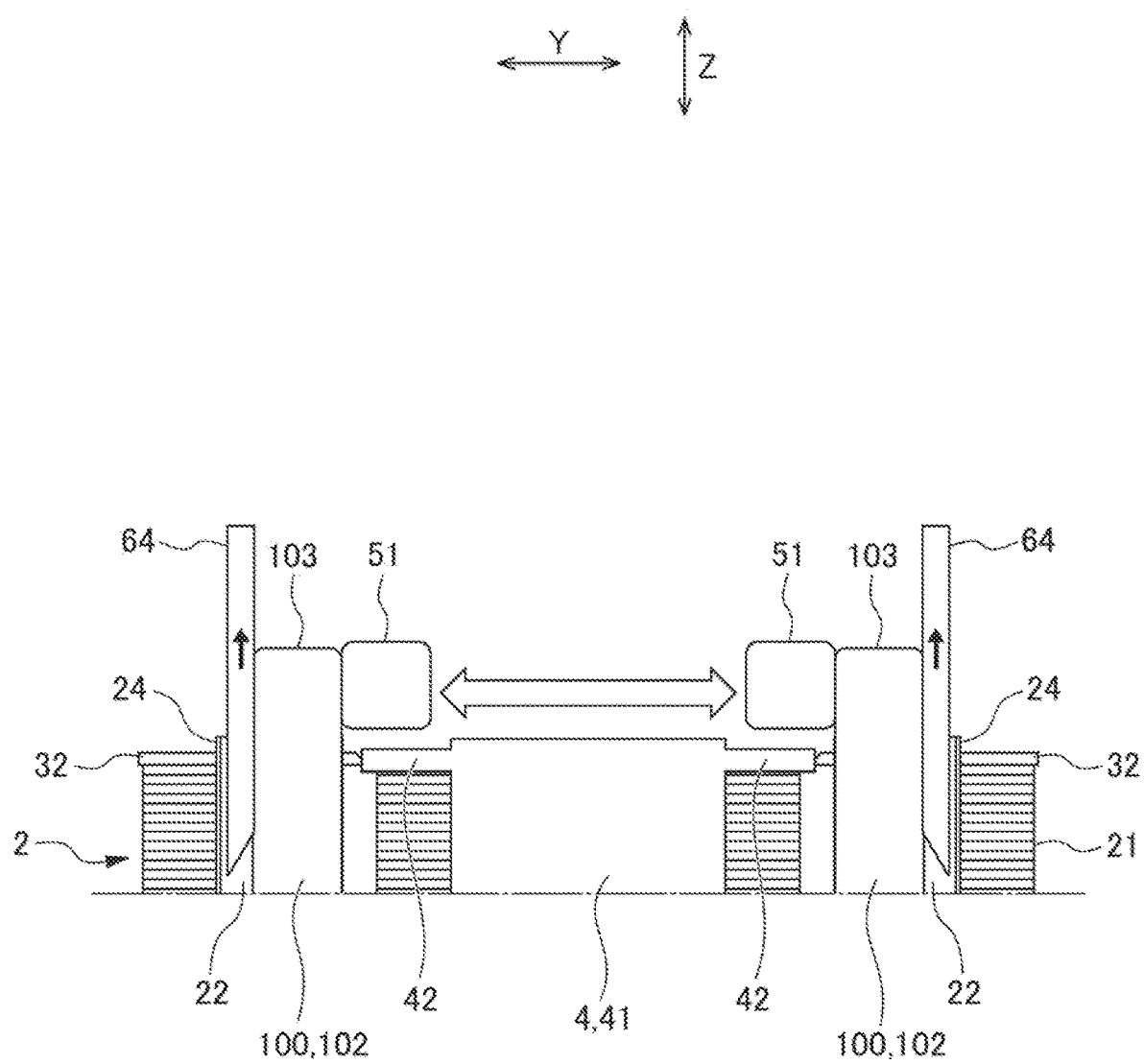
FIG. 9H is a schematic view for describing the operation process for inserting coils into slots from inside the stator core.
Figure 10H:
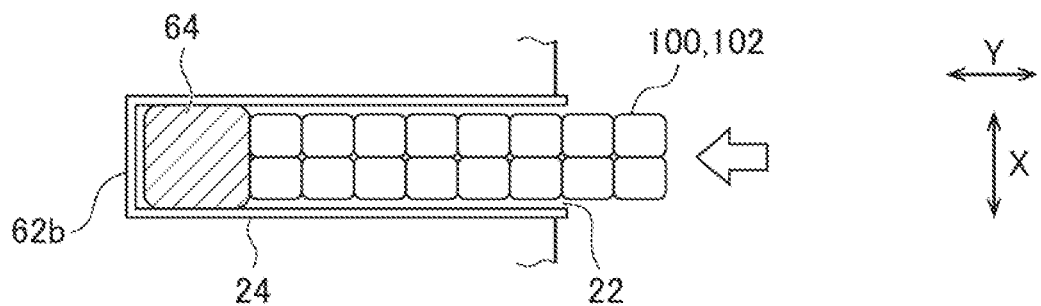
FIG. 10H is a schematic view that illustrates a situation in which a coil is inserted into a slot.

In conjunction with the belt-shaped coil 100 further diametrically expanding, the linear sections 102 in the belt-shaped coil 100 move radially outward such that the distance L to the fourth guide members 64 shrinks, and eventually come into contact with or approach the fourth guide members 64 (fourth movement step; FIG. 9H, FIG. 10H).

When the linear sections 102 in the belt-shaped coil 100 come into contact with or approach the fourth guide members 64, the controller 10 causes the actuators 640 corresponding to the fourth guide members 64 to perform driving to thereby cause the fourth guide members 64 to move outward in the central axial direction of the stator core 2. As a result, the fourth guide members 64 are withdrawn from inside the electrically-insulating papers 24 within the slots 22 (fourth withdrawal step).

Figure 9I:
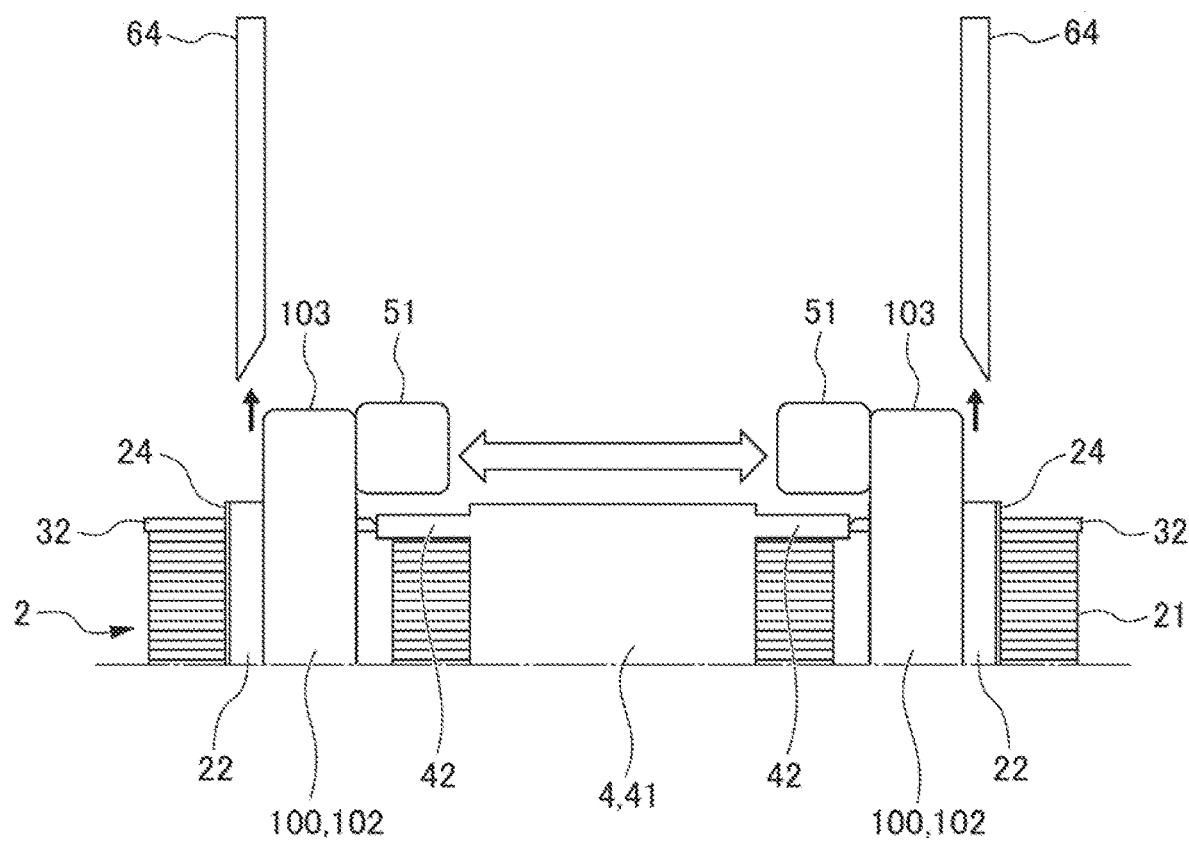
FIG. 9I is a schematic view for describing the operation process for inserting coils into slots from inside the stator core.
Figure 10I:
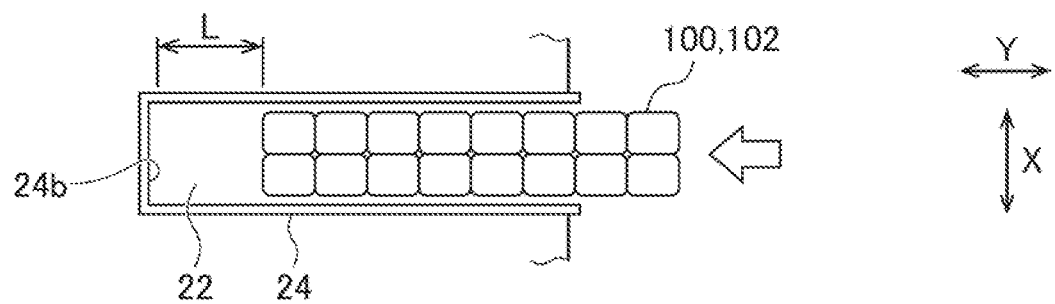
FIG. 10I is a schematic view that illustrates a situation in which a coil is inserted into a slot.

After the fourth guide members 64 are withdrawn, a gap for a distance L corresponding to the vertical width W1 of each fourth guide members 64 is formed between the linear sections 102 in the belt-shaped coil 100 and backs 24b on the deepest side of the electrically-insulating papers 24 within the slots 22 (FIG. 9I, FIG. 10I).

Figure 9J:
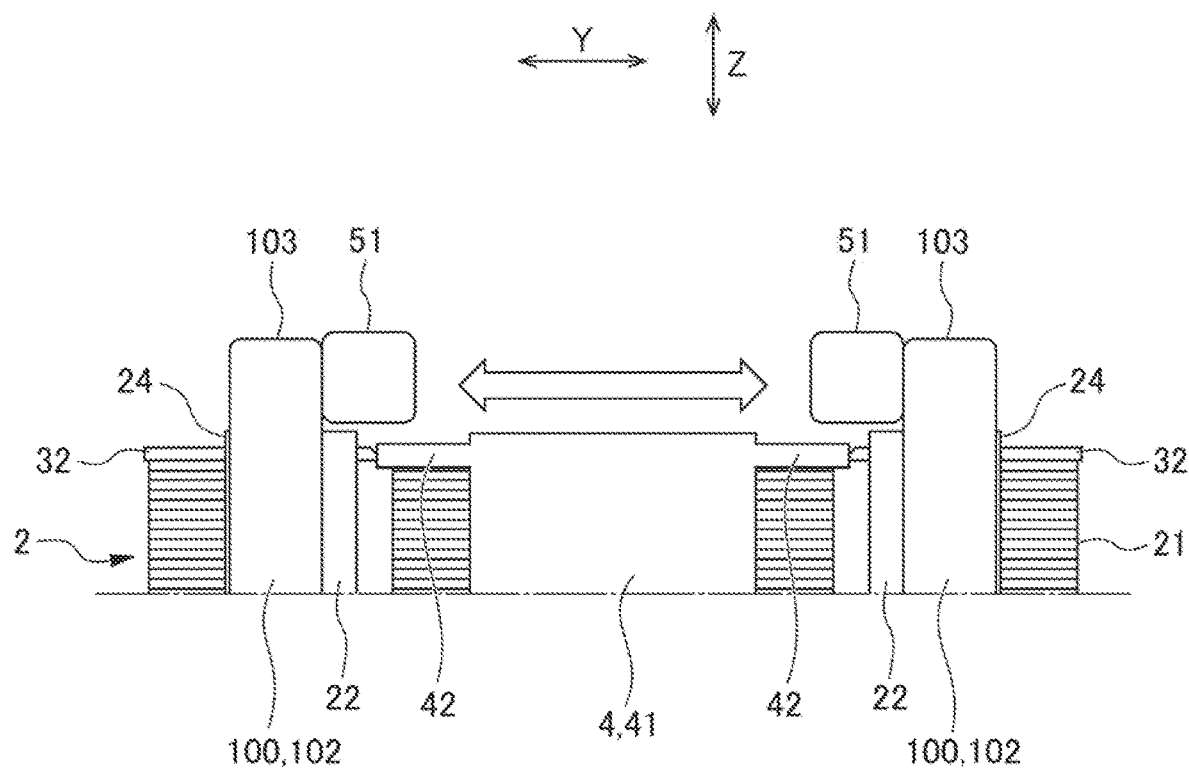
FIG. 9J is a schematic view for describing the operation process for inserting coils into slots from inside the stator core.
Figure 10J:
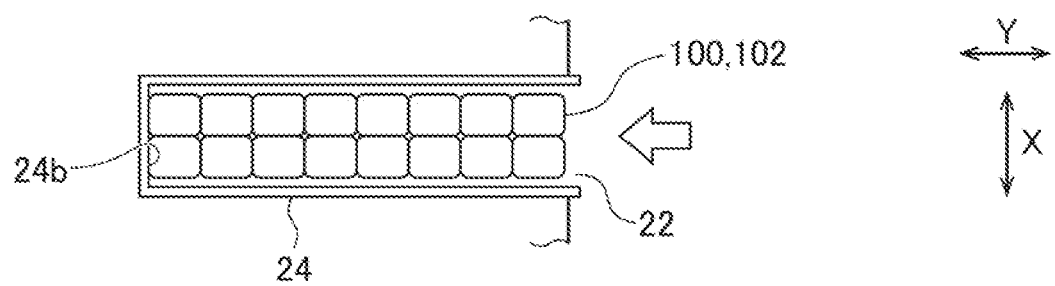
FIG. 10J is a schematic view that illustrates a situation in which a coil is inserted into a slot.

When the belt-shaped coil 100 further diametrically expands, the linear sections 102 in the belt-shaped coil 100 move radially outward such that the remaining distance L within the slots 22 shrink, and eventually come into contact with or approach the backs 24b of the electrically-insulating paper 24 (fifth movement step; FIG. 9J, FIG. 10J).

Figure 11:
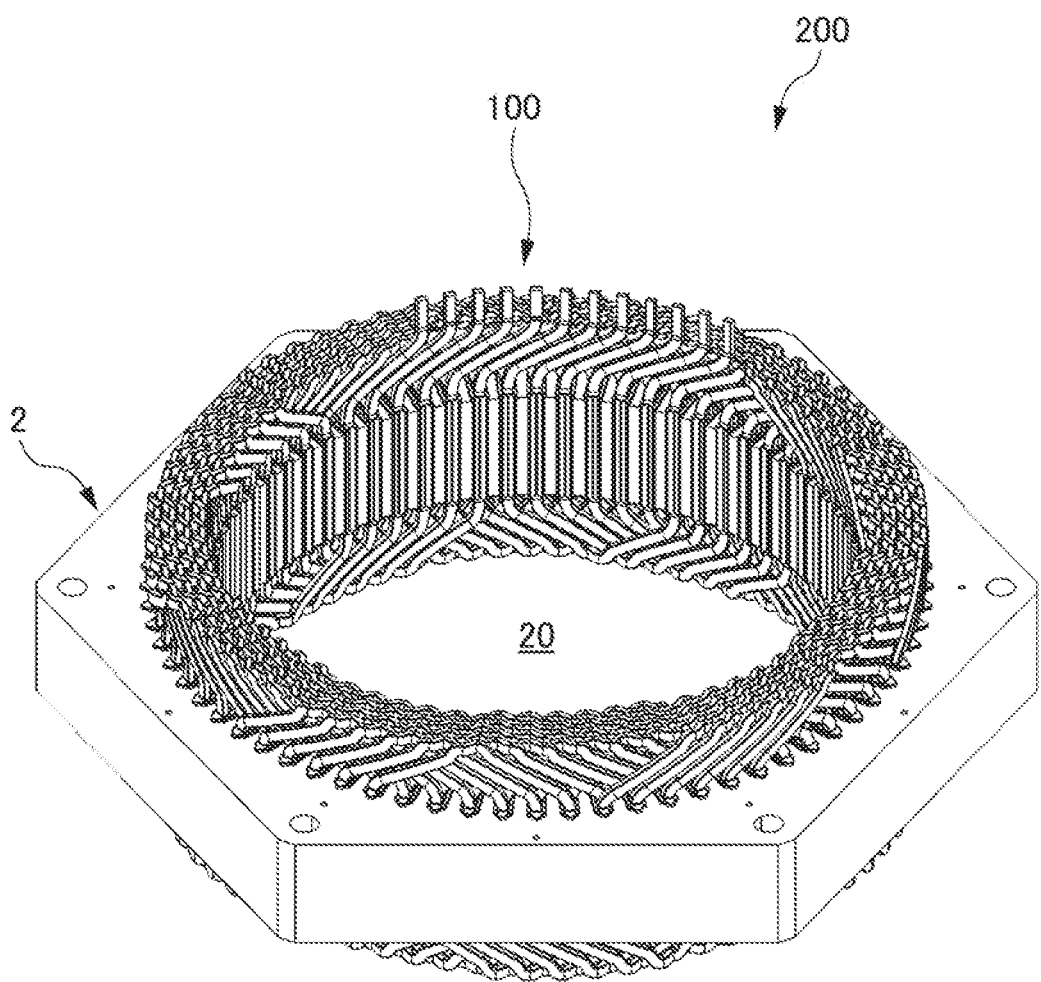
FIG. 11 is a perspective view that illustrates the appearance of a stator.

As a result, the linear sections 102 in the belt-shaped coil 100 are accommodated inside the electrically-insulating paper 24 within the slots 22, and the stator 200 is completed (FIG. 11).

By virtue of the stator assembly apparatus 1 and the stator assembly method according to the present embodiment above, the following effects are achieved. That is, a stator assembly apparatus is the stator assembly apparatus 1, which is configured to assemble the stator 200 by, from inside the stator core 2, inserting the linear sections 102 in the belt-shaped coil 100 into the slots 22 in the stator core 2, the electrically-insulating papers 24 being mounted to the slots 22, the apparatus including: the plurality of guide members 61, 62, 63, and 64 that are provided to respectively correspond to the slots 22, are provided in a manner enabling insertion into and withdrawal from inside the electrically-insulating papers 24 in a central axial direction of the stator core 2, and are arranged in a radial direction of the slots 22 in a state of having been inserted inside the electrically-insulating papers 24; the coil pressing sections 51 configured to cause the belt-shaped coil 100 to move inside the electrically-insulating papers 24 by pressing the coil radially outward with respect to the stator core 2; and the controller 10 configured to control movement of the plurality of guide members 61, 62, 63, and 64 in the central axial direction of the stator core 2, in which, each time the belt-shaped coil 100 moved by the coil pressing sections 51 comes into contact with or approaches a guide member (one of the guide members 61, 62, 63, and 64) positioned most radially inside from among the plurality of guide members 61, 62, 63, and 64 disposed inside the electrically-insulating papers 24, the controller 10 causes the guide member (one of the guide members 61, 62, 63, and 64) positioned most radially inside to move so as to sequentially withdraw from within the electrically-insulating papers 24.

The stator assembly method is for assembling the stator 200 by, from inside the stator core 2, inserting the belt-shaped coil 100 into the slots 22 in the stator core 2, the electrically-insulating papers 24 being mounted to the slots 22, the method including: an insertion step for inserting the plurality of guide members 61, 62, 63, and 64, arranged in a radial direction of the slots 22, inside the electrically-insulating papers 24 from outside in a central axial direction of the stator core 2, before inserting the belt-shaped coil 100 into the slots 22; a movement step for causing the belt-shaped coil 100, which is inside the stator core 2, to move radially outward with respect to the stator core 2 until coming into contact or approaching, from among the plurality of guide members 61, 62, 63, and 64, a guide member (one of the guide members 61, 62, 63, and 64) positioned most radially inside; and a withdrawal step for, each time the belt-shaped coil 100 moving radially outward with respect to the stator core 2 come into contact with or approaches the guide member (one of the guide members 61, 62, 63, and 64) positioned most radially inside from among the plurality of guide members 61, 62, 63, and 64 disposed inside the electrically-insulating papers 24, sequentially withdrawing the guide member (one of the guide members 61, 62, 63, and 64) positioned most radially inside from inside the electrically-insulating papers 24.

As a result, when inserting the belt-shaped coil 100 into slots 22 from inside the stator core 2, the plurality of guide members 61, 62, 63, and 64 can support the electrically-insulating papers mounted into the slots 22 such that the electrically-insulating papers can open from inside. In addition, in a process in which the belt-shaped coil 100 moves within a slot 22, the plurality of guide members 61, 62, 63, and 64 sequentially withdraw in the central axial direction of the stator core 2 without substantially moving in the radial direction within the slot 22, and thus it is possible to always keep the distance between the belt-shaped coil 100 and the guide members 62, 63, and 64 to less than or equal to a set distance (the vertical width W1 of a guide member in the radial direction of the stator core 2). Accordingly, it is possible to insert the belt-shaped coil 100 into the slots 22 without catching or entangling the electrically-insulating papers 24, and it is possible to improve buckling resistance for the electrically-insulating papers 24. By changing, as appropriate, the vertical width W1 of each of the guide members 61, 62, 63, and 64 in the radial direction of the stator core 2 or the number of guide members for a single slot 22, it is possible to easily handle changes for insertion load and tension (rigidity) for the belt-shaped coil 100. Moreover, because the direction of movement of the guide members 61, 62, 63, and 64 is only in the central axial direction of the stator core 2, it is also possible to simplify movement mechanisms for the guide members 61, 62, 63, and 64.

In the stator assembly apparatus 1 and the stator assembly method according to the present embodiment, the first guide member 61 most radially inside before the belt-shaped coil 100 is inserted is disposed so as to hang at the opening ends 24a of an electrically-insulating paper 24 in a state of having been inserted inside the electrically-insulating paper 24.

As a result, by the first guide member 61 being disposed between a pair of opening ends 24a belonging to the electrically-insulating paper 24, it is possible to hold the opening ends 24a belonging to the electrically-insulating paper 24 in an open state before the belt-shaped coil 100 is inserted. As a result, contact between linear sections 102 in the belt-shaped coil 100, which move toward the slot 22, and the electrically-insulating paper 24 is suppressed, and it is possible to smoothly introduce the linear sections 102 in the belt-shaped coil 100 inside the electrically-insulating paper 24.

In the stator assembly apparatus 1 and the stator assembly method according to the present embodiment, each vertical width W1 of the plurality of guide members 61, 62, 63, and 64 in a radial direction of the stator core 2 is the same width.

As a result, when causing the plurality of guide members 61, 62, 63, and 64 to sequentially withdraw from within the slot 22 in conjunction with movement by the linear sections 102 in the belt-shaped coil 100, it is possible to keep the width of a gap (the distance L) in the radial direction within the slot 22 to less than or equal to a certain width. Accordingly, it is possible to establish both an effect of supporting the electrically-insulating papers 24 by the plurality of guide members 61, 62, 63, and 64 such that the electrically-insulating papers 24 open, and an effect of improving insertability of the linear sections 102 in the belt-shaped coil 100.

In the stator assembly apparatus 1 and stator assembly method according to the present embodiment, each horizontal width W2 of the plurality of guide members 61, 62, 63, and 64 in a circumferential direction of the stator core 2 is greater than or equal to the width for the linear sections 102 in the belt-shaped coil 100 in the circumferential direction of the stator core 2.

As a result, it is possible to more reliably prevent linear sections 102 in the belt-shaped coil 100, which move into a slot 22, from catching the electrically-insulating paper 24 within the slot 22, in a state where the plurality of guide members 61, 62, 63, and 64 have supported the electrically-insulating paper 24 such that the electrically-insulating paper 24 opens.

In the stator assembly apparatus 1 and the stator assembly method according to the present embodiment, the plurality of guide members 61, 62, 63, and 64 are respectively disposed so as to face each other on both sides of the stator core 2 in the central axial direction of the stator core 2 and are disposed such that the tip ends 61a, 62a, 63a, and 64a face each other inside the electrically-insulating papers 24 when inserted inside the electrically-insulating papers 24 within the slots 22 from outside on both sides in the central axial direction of the stator core 2.

As a result, it is possible to reduce the travel distance for each of the plurality of guide members 61, 62, 63, and 64, and thus it is possible to shorten a travel time spent inserting and withdrawing the guide members 61, 62, 63, and 64.

The stator assembly apparatus 1 described above is configured such that the central axial direction of the stator core 2 and the coil winding jig 4 is disposed in the horizontal direction, but may be configured such that the central axial direction of the stator core 2 and the coil winding jig 4 are disposed in a direction other than the horizontal direction, such as the vertical direction.

EXPLANATION OF REFERENCE NUMERALS

1 Stator assembly apparatus
10 Controller
2 Stator core
22 Slot
24 Electrically-insulating paper (electrically-insulating member)
24a Opening end
51 Coil pressing section (presser)
61 First guide member
61a Tip end of first guide member
62 Second guide member
62a Tip end of second guide member
63 Third guide member
63a Tip end of third guide member
64 Fourth guide member
64a Tip end of fourth guide member
100 Belt-shaped coil
200 Stator
W0 Width of belt-shaped coil
W1 Vertical width
W2 Horizontal width

What is claimed is:

1. A stator assembly apparatus configured to assemble a stator by, from inside a stator core, inserting a coil into slots in the stator core, electrically-insulating members being mounted to the slots, the apparatus comprising:
   a plurality of guide members that are provided to respectively correspond to the slots, are provided in a manner enabling insertion into and withdrawal from inside the electrically-insulating members in a central axial direction of the stator core, and are arranged in a radial direction of the slots in a state of having been inserted inside the electrically-insulating members;
   a presser configured to cause the coil to move inside the electrically-insulating members by pressing the coil radially outward with respect to the stator core; and
   a controller configured to control movement of the plurality of guide members in the central axial direction of the stator core, wherein
   each time the coil moved by the presser comes into contact with or approaches a guide member positioned most radially inside from among the plurality of guide members inside the electrically-insulating members, the controller causes the guide member positioned most radially inside to move so as to sequentially withdraw from within the electrically-insulating members.

2. The stator assembly apparatus according to claim 1, wherein
   the guide member most radially inside is positioned at opening ends of the electrically-insulating member in a state of being inserted inside the electrically-insulating member, before the coil is inserted.

3. The stator assembly apparatus according to claim 1, wherein
   each vertical width of the plurality of guide members in a radial direction of the stator core is the same width.

4. The stator assembly apparatus according to claim 1, wherein
   each horizontal width of the plurality of guide members in a circumferential direction of the stator core is greater than or equal to a width of the coil in the circumferential direction of the stator core.

5. The stator assembly apparatus according to claim 1, wherein
the plurality of guide members are respectively disposed so as to face each other on both sides of the stator core in the central axial direction of the stator core and are disposed such that tip ends of the plurality of guide members face each other inside the electrically-insulating members when inserted inside the electrically-insulating members from outside on both sides in the central axial direction of the stator core.

6. A stator assembly method for assembling a stator by, from inside a stator core, inserting a coil into slots in the stator core, electrically-insulating members being mounted to the slots, the method comprising:
inserting a plurality of guide members, arranged in a radial direction of the slots, inside the electrically-insulating members from outside in a central axial direction of the stator core, before inserting the coil into the slots;
causing the coil to move radially outward with respect to the stator core until coming into contact or approaching, from among the plurality of guide members, a guide member positioned most radially inside; and
each time the coil moving radially outward with respect to the stator core come into contact with or approaches the guide member positioned most radially inside from among the plurality of guide members disposed inside the electrically-insulating members, sequentially withdrawing the guide member positioned most radially inside from within the electrically-insulating members.

7. The stator assembly method according to claim 6, wherein the inserting the plurality of guide members comprises inserting the plurality of guide members such that the guide member most radially inside from among the plurality of guide members hangs at opening ends of the electrically-insulating members.

8. The stator assembly method according to claim 6, wherein each vertical width of the plurality of guide members in a radial direction of the stator core is the same width.

9. The stator assembly method according to claim 6, wherein
each horizontal width of the plurality of guide members in a circumferential direction of the stator core is greater than or equal to a width of the coil in the circumferential direction of the stator core.

10. The stator assembly method according to claim 6, wherein
the plurality of guide members are respectively disposed so as to face each other on both sides of the stator core in the central axial direction of the stator core, and
the inserting the plurality of guide members comprises disposing the plurality of guide members such that the plurality of guide members are respectively inserted inside the electrically-insulating members from outside on both sides of the stator core in the central axial direction of the stator core and tip ends of the plurality of guide members face each other inside the electrically-insulating members.

* * * * *